US012809065B2

(12) United States Patent
Yan et al.

(10) Patent No.: US 12,809,065 B2
(45) Date of Patent: Nov. 24, 2026

(54) LASER DEVICE AND LASER PROJECTION APPARATUS

(71) Applicant: Hisense Laser Display Co., Ltd., Shandong (CN)

(72) Inventors: Ke Yan, Shandong (CN); Youliang Tian, Shandong (CN); Xianrong Liu, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 276 days.

(21) Appl. No.: 18/443,145

(22) Filed: Feb. 15, 2024

(65) Prior Publication Data

US 2024/0187557 A1 Jun. 6, 2024

Related U.S. Application Data

(63) Continuation-in-part of application No. PCT/CN2022/113438, filed on Aug. 18, 2022.

(30) Foreign Application Priority Data

Aug. 18, 2021 (CN) ......................... 202110949508.6
Aug. 18, 2021 (CN) ......................... 202110949509.0

(51) Int. Cl.
*G02B 3/08* (2006.01)
*G02B 27/00* (2006.01)
*G02B 27/30* (2006.01)

(52) U.S. Cl.
CPC ........... *G02B 3/08* (2013.01); *G02B 27/0056* (2013.01); *G02B 27/30* (2013.01)

(58) Field of Classification Search
CPC .......... G02B 3/08; G02B 5/18; G02B 5/1809; G02B 5/1814; G02B 5/1819;
(Continued)

(56) References Cited

U.S. PATENT DOCUMENTS

2006/0092515 A1 5/2006 Kim et al.
2007/0285621 A1 12/2007 Kimura
(Continued)

FOREIGN PATENT DOCUMENTS

CN 1117633 A 2/1996
CN 1740844 A 3/2006
(Continued)

OTHER PUBLICATIONS

International search report of PCT application No. PCT/CN2022/113438 issued on Dec. 21, 2023.
(Continued)

*Primary Examiner* — Stephone B Allen
*Assistant Examiner* — Adam W Booher
(74) *Attorney, Agent, or Firm* — Knobbe, Martens, Olson & Bear, LLP

(57) ABSTRACT

Provided is a laser device. The laser device includes a plurality of light-emitting components and a diffractive optical element. The plurality of light-emitting components are configured to emit laser beams of various colors. The diffractive optical element is disposed on light-output paths of the plurality of light-emitting components, wherein the diffractive optical element includes a plurality of diffractive areas, each of the plurality of diffractive areas corresponding to one color laser beam; and the diffractive optical element is configured to shape incident laser beams.

20 Claims, 16 Drawing Sheets

(58) Field of Classification Search

CPC .... G02B 5/1866; G02B 5/1876; G02B 5/188; G02B 5/1885; G02B 5/189; G02B 2005/1804; G02B 27/0037; G02B 27/0043; G02B 27/0056; G02B 27/09; G02B 27/18; G02B 27/30; G02B 13/16; H04N 9/31–3197

See application file for complete search history.

(56) References Cited

U.S. PATENT DOCUMENTS

| | | | | |
|---|---|---|---|---|
| 2009/0135701 | A1* | 5/2009 | Matsubara | G11B 7/1275 |
| 2009/0153977 | A1* | 6/2009 | Chen | G03B 21/208 359/638 |
| 2009/0161033 | A1* | 6/2009 | Kaise | H04N 9/3108 349/8 |
| 2013/0002972 | A1 | 1/2013 | Tanaka | |
| 2013/0182327 | A1* | 7/2013 | Miyasaka | G02B 5/1842 359/566 |
| 2020/0083664 | A1* | 3/2020 | Miura | H01S 5/4037 |
| 2022/0146921 | A1* | 5/2022 | Yu | G03B 21/2013 |
| 2025/0199390 | A1* | 6/2025 | Li | H04N 9/31 |

FOREIGN PATENT DOCUMENTS

| | | | |
|---|---|---|---|
| CN | 101075018 | A | 11/2007 |
| CN | 102096293 | A | 6/2011 |
| CN | 208569202 | U | 3/2019 |
| CN | 210465983 | U | 5/2020 |
| CN | 111323996 | A | 6/2020 |
| CN | 112114480 | A | 12/2020 |
| CN | 112987472 | A | 6/2021 |
| CN | 113625522 | A | 11/2021 |
| CN | 113625523 | A | 11/2021 |

OTHER PUBLICATIONS

China National Intellectual Property Administration, First office action of Chinese application No. 202110949508.6 issued on Apr. 14, 2022, which is foreign counterpart application of this US application.

China National Intellectual Property Administration, Second office action of Chinese application No. 202110949508.6 issued on Sep. 15, 2022, which is foreign counterpart application of this US application.

China National Intellectual Property Administration, Third office action of Chinese application No. 202110949508.6 issued on Jan. 13, 2023, which is foreign counterpart application of this US application.

China National Intellectual Property Administration, Decision of rejection of Chinese application No. 202110949508.6 issued on Apr. 22, 2023, which is foreign counterpart application of this US application.

China National Intellectual Property Administration, Notification to grant patent right for invention of Chinese application No. 202110949508.6 issued on Jun. 12, 2023, which is foreign counterpart application of this US application.

China National Intellectual Property Administration, First office action of Chinese application No. 202110949509.0 issued on Jun. 1, 2022, which is foreign counterpart application of this US application.

China National Intellectual Property Administration, Notification to grant patent right for invention of Chinese application No. 202110949509.0 issued on Oct. 10, 2022, which is foreign counterpart application of this US application.

Wei Zhang et al., Design of Optical Elements for Beam Shaping and Uniform Illumination in Laser Digital Projection, Acta Optica Sinica, vol. 35, No. 8, Aug. 31, 2015, entire document.

Zhihui Liu et al., Homogenization of the Semiconductor Laser Planar Array Using Diffractive Micro-Lens Array, Chinese Journal of Lasers, vol. 41, No. 1, Jan. 31, 2014, entire document.

* cited by examiner

LASER DEVICE AND LASER PROJECTION APPARATUS

The present disclosure is a continuation-in-part application based on PCT/CN2022/113438, which claims priority to Chinese Patent Application No. 202110949509.0, filed on Aug. 18, 2021, and Chinese Patent Application No. 202110949508.6, filed on Aug. 18, 2021, the disclosures of which are herein incorporated by reference in their entireties.

TECHNICAL FIELD

The present disclosure relates to the field of laser projection technologies, and in particular, relates to a laser device and a laser projection apparatus.

BACKGROUND

Laser projection technology is a technology for projection display with laser as a light source. The laser projection technology enables a vivid display of abundant and gorgeous colors of the objective world. Moreover, the laser projection technology achieves a high color gamut, which can reach more than 90% of the color gamut of human eyes and is more than twice that of a conventional projection device.

SUMMARY

In one aspect, a laser device is provided. The laser device includes a plurality of light-emitting components and a diffractive optical element. The plurality of light-emitting components are configured to emit laser beams of various colors. The diffractive optical element is disposed on light-output paths of the plurality of light-emitting components, wherein the diffractive optical element includes a plurality of diffractive areas, the plurality of diffractive areas corresponding to the laser beams of the various colors; and the diffractive optical element is configured to shape incident laser beams, such that light spots of the shaped laser beams are matched with a light modulation device.

In another aspect, a laser device is provided. The laser device includes a plurality of light-emitting components, a first light-combining mirror group, and a diffractive optical element. The plurality of light-emitting components are configured to emit laser beams of various colors. The first light-combining mirror group is disposed on light-output paths of the plurality of light-emitting components and configured to combine the laser beams emitted by the plurality of light-emitting components. The diffractive optical element is disposed at a light-output side of the first light-combining mirror group and configured to shape the laser beams combined by the first light-combining mirror group and transmit light spots of the shaped laser beams to a same position.

In still another aspect, a laser projection apparatus is provided. The laser projection apparatus includes a light source assembly, a light modulating assembly, and a projection lens. The light source assembly is configured to emit an illumination beam, and the light source assembly includes a plurality of laser devices and a second light-combining mirror group. The laser device is the laser device described above. The second light-combining mirror group is disposed at an intersection of laser beams emitted by the plurality of laser devices and configured to combine the laser beams emitted by the plurality of laser devices. The light modulating assembly is configured to modulate the illumination beam emitted by the light source assembly to acquire a projection beam. The light modulating assembly includes a light modulation device configured to modulate the illumination beam emitted by the light source assembly to acquire the projection beam. The projection lens is configured to perform imaging with the projection beam.

In still another aspect, a laser projection apparatus is provided. The laser projection apparatus includes a light source assembly, a light modulating assembly, and a projection lens. The light source assembly includes the laser device described above. The light source assembly is configured to emit an illumination beam. The light modulating assembly is configured to modulate the illumination beam emitted by the light source assembly to acquire a projection beam. The light modulating assembly includes a light modulation device configured to modulate the illumination beam emitted by the light source assembly to acquire the projection beam. The projection lens is configured to perform imaging with the projection beam.

DESCRIPTION OF THE REFERENCE NUMERALS

Figure 1:
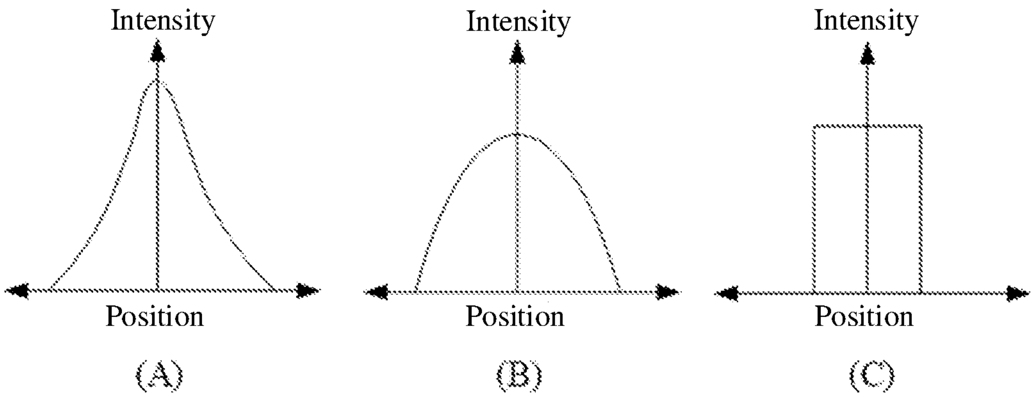
FIG. 1 illustrates graphs of intensity distributions of light spots according to some embodiments.

- laser projection apparatus 1;
- light source assembly 10; laser device 11; first laser device 11A; second laser device 11B; package 110; base plate 101; frame 102; first frame 1021; second frame 1022; third frame 1023; opening 104; accommodating space 105; light-emitting component 120; first light-emitting component 121; first light spot 121A; fourth light spot 121B; second light-emitting component 122; second light spot 122A; fifth light spot 122B; third light-emitting component 123; third light spot 123A; sixth light spot 123B; seventh light spot 124; reflecting prism 130; reflecting surface 103; light-transmitting layer 140; collimating lens group 150; collimating lens 151; Fresnel structure 160; light-output surface 170; first light-output area 171; second light-output area 172; third light-output area 173; heat sink 180; diffractive optical element 12; first diffractive area 1201; second diffractive area 1202; third diffractive area 1203; substrate 1204; diffractive portion 1205; light-combining mirror group 13; first light-combining mirror 131; second light-combining mirror 132; third light-combining mirror 133; optical path conversion mirror 134; polarization conversion element 135; second light-combining mirror group 15; fourth light-combining mirror 13A; fifth light-combining mirror 13B; phase retarder 14;
- light modulating assembly 20; reflecting mirror 220; lens assembly 230; digital micromirror device 240; minute reflector 2401; prism assembly 250; first prism 251; second prism 252;
- projection lens 30; and
- whole housing 40.

DETAILED DESCRIPTION

The technical solutions in some embodiments of the present disclosure will be clearly and fully described below with reference to the accompanying drawings. However, the described embodiments are only a few, but not all embodiments of the present disclosure. All other embodiments acquired by a person of ordinary skill in the art based on the embodiments provided in the present disclosure fall within the protection scope of the present disclosure.

Unless required otherwise in the context, throughout the description and claims, the term "comprise" and other variations thereof, such as "comprises" and "comprising," are interpreted as open and inclusive, i.e., "comprising, but not limited to". In the description herein, the terms "one embodiment", "some embodiments," "exemplary embodiments," "example," "specific example," or "some examples" are intended to indicate that a particular feature, structure, material, or characteristic related to the embodiment or example is included in at least one embodiment or example of the present disclosure. The schematic representations of the above terms are not necessarily intended to refer to the same embodiment or example. In addition, the particular feature, structure, material, or characteristic as described may be included in any one or more embodiments or examples in any suitable manner.

Hereinafter, the terms "first" and "second" are used for descriptive purposes only and are not to be construed as indicating or implying relative importance or to implicitly indicate the number of technical features indicated. Thus, features defined as "first," "second" explicitly or implicitly include one or more of the features. In the descriptions of the embodiments of the present disclosure, "a plurality" means two or more, unless otherwise specified.

In describing some embodiments, the expression "connected" and derivatives thereof may be used. For example, the term "connected" may be used in describing some embodiments to indicate that two or more components are in direct physical or electrical contact with each other. The term "connected", however, may also mean that two or more components are not in direct contact with each other, but still cooperate or interact with each other. The embodiments disclosed herein are not necessarily limited to the contents herein.

"A and/or B" includes the following three combinations: A alone, B alone, and a combination of A and B.

The use of "adapted to" or "configured to" herein means an open and inclusive wording that does not exclude devices adapted to or configured to perform additional tasks or steps.

As used herein, "about," "almost," or "approximately" includes the stated value as well as a mean value within an acceptable range of deviation of a specific value as determined by one of ordinary skill in the art in view of the measurement in question and an error associated with the measurement of a specific quantity (i.e., the limitations of the measurement system).

As used herein, "parallel," "perpendicular," and "equal" include the stated case and cases that approximate the stated case, where the range of the approximate cases is within an acceptable range of deviation as determined by one of ordinary skill in the art in view of the measurement in question and an error associated with the measurement of a specific quantity (i.e., the limitations of the measurement system).

FIG. 1 illustrates graphs of intensity distributions of light spots according to some embodiments.

In the related art, in a multi-chip laser (MCL) laser device, the intensity of a laser beam emitted by a single laser chip has a Gaussian distribution. As shown in (A) of FIG. 1, the intensity is high at a central position of the laser beam emitted by the single laser chip, while the intensity is low at an edge position of the laser beam. Such a non-uniform intensity distribution of the laser beam cannot satisfy the use requirements of a laser projection apparatus.

It should be noted that Gaussian distribution, also referred to as normal distribution, has a bell-shaped curve distributed in bilateral symmetry, with low ends and a high middle.

To acquire a laser beam with a uniform intensity distribution, a diffuser may be disposed at a light-output side of the laser device to homogenize the laser beam. However, in practice, as shown in (B) of FIG. 1, a difference still exists between the intensity at the central position and the intensity at the edge position of the laser beam that has been homogenized by the diffuser. The diffusion angle of the laser beam has to be increased to achieve a uniform intensity distribution of the laser beam, which in turn leads to a loss of the laser beam.

In addition, the laser beam may be shaped and homogenized by a light homogenizing component, such as a light pipe, such that the light spot of the laser beam is converted into a rectangular light spot with a uniform intensity distribution. As shown in (C) of FIG. 1, the rectangular light spot has a uniform intensity, which can satisfy the use requirements of the laser projection apparatus. However, the light pipe has a narrow light-incident entrance, such that the laser beam is vulnerable to loss while the laser beam is incident into the light pipe. Moreover, to achieve a certain intensity uniformity of the laser beam, the light pipe needs to be long, resulting in a great length of the whole optical system, which is not conducive to the miniaturization of the laser projection apparatus.

Figure 2:
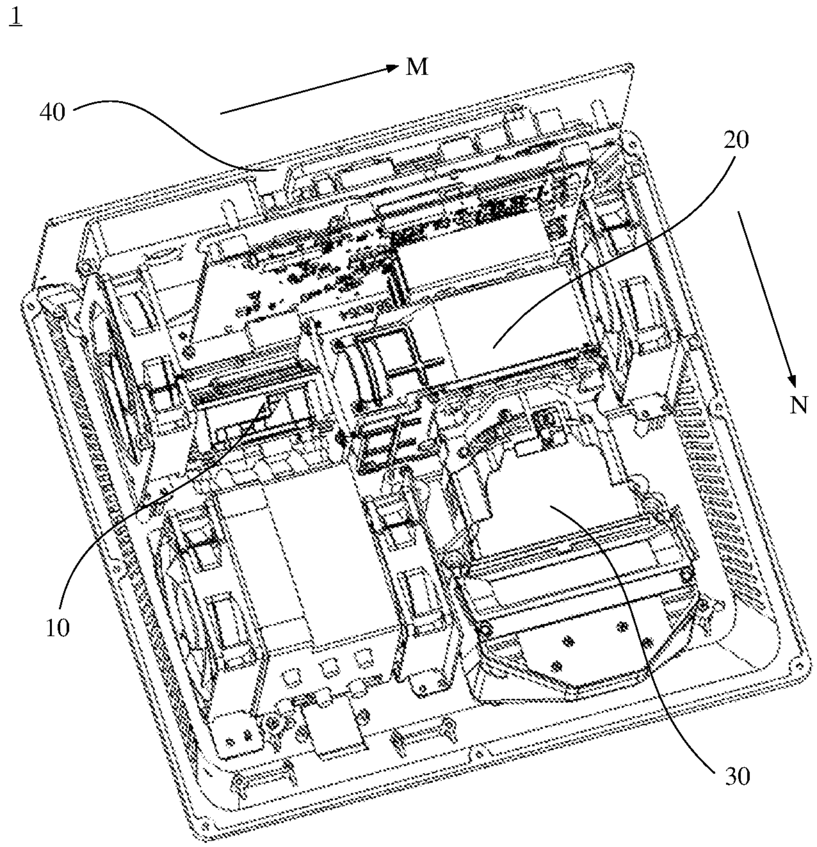
FIG. 2 is a structural diagram of a laser projection apparatus according to some embodiments.

To solve the above problems, some embodiments of the present disclosure provide a laser projection apparatus 1. FIG. 2 is a structural diagram of a laser projection apparatus according to some embodiments. As shown in FIG. 2, the laser projection apparatus 1 includes a whole housing 40 (only a part of the whole housing 40 is shown in FIG. 2), and a light source assembly 10, a light modulating assembly 20, and a projection lens 30 that are assembled in the whole housing 40. The light source assembly 10 is configured to provide an illumination beam (laser beam). The light modulating assembly 20 is configured to modulate the illumination beam provided by the light source assembly 10 with an image signal to acquire a projection beam. The projection lens 30 is configured to transmit the projection beam on a screen or a wall for imaging.

The light source assembly 10, the light modulating assembly 20, and the projection lens 30 are connected in sequence along a propagation direction of the laser beam, and are each wrapped by corresponding housings. The corresponding housings of the light source assembly 10, the light modulating assembly 20, and the projection lens 30 support the respective optical components and enable the optical components to satisfy certain sealing or airtight requirements.

Figure 3:
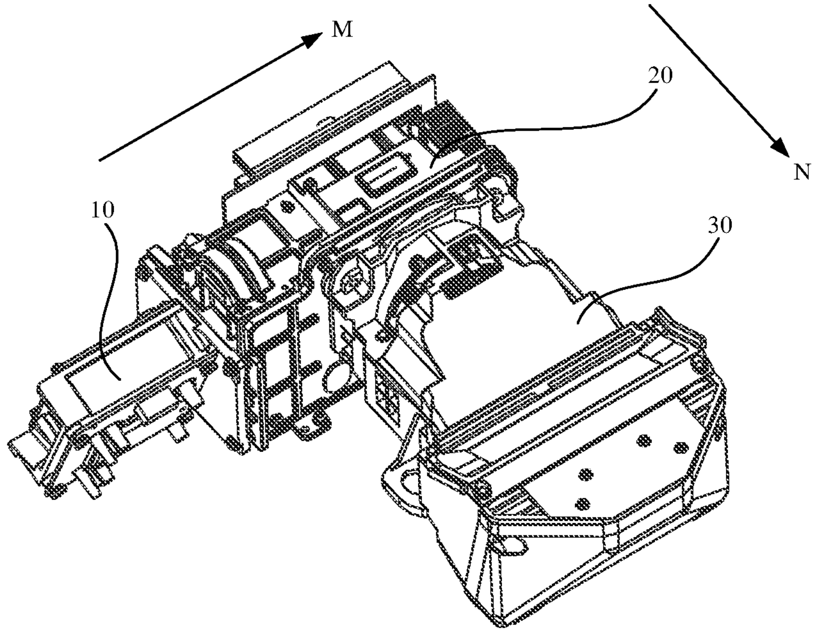
FIG. 3 is a partial structural diagram of a laser projection apparatus according to some embodiments.

FIG. 3 is a partial structural diagram of a laser projection apparatus according to some embodiments.

One end of the light modulating assembly 20 is connected to the light source assembly 10, and the light source assembly 10 and the light modulating assembly 20 are disposed along an output direction (refer to the M direction shown in FIG. 3) of the illumination beam of the laser projection apparatus 1. The other end of the light modulating assembly 20 is connected to the projection lens 30, and the light modulating assembly 20 and the projection lens 30 are disposed along an output direction (refer to the N direction shown in FIG. 3) of the projection beam of the laser projection apparatus 1. The other end of the light modulating assembly 20 is connected to the light source assembly 10. The output direction M of the illumination beam is approximately perpendicular to the output direction N of the projection beam. Such a connection structure adapts to the optical path characteristics of a reflective light valve in the light modulating assembly 20, and also facilitates shortening the length of an optical path in a dimensional direction, which is conducive to a structural arrangement of the whole device. For example, in the case that the light source assembly 10, the light modulating assembly 20, and the projection lens 30 are disposed in a dimensional direction (e.g., the M direction), the optical path in the dimensional direction has a great length, which is not conducive to the structural arrangement of the whole device. The reflective light valve will be described later.

In some embodiments, the light source assembly 10 provides lights of three primary colors in a time sequence (lights of other colors may be further added to the lights of three primary colors), and then human eyes see a white light formed by a mixture of the lights of three primary colors due to persistence of vision of human eyes. Alternatively, the light source assembly 10 outputs lights of three primary colors simultaneously to continuously emit the white light. The light source assembly 10 includes a laser device that emits laser beams of at least one color, such as emitting only a red laser beam or a blue laser beam or a green laser beam, or emitting a red laser beam, a blue laser beam, and a green laser beam simultaneously. The laser device may be a laser device with a multi-chip package structure. The laser device with the multi-chip package structure means that a plurality of light-emitting chips arranged in rows or in a row-column matrix are encapsulated on the same base plate. The plurality of light-emitting chips may be encapsulated in a single space by a single package or in a plurality of spaces by a plurality of packages. Further, the package may be made of ceramic.

Figure 5:
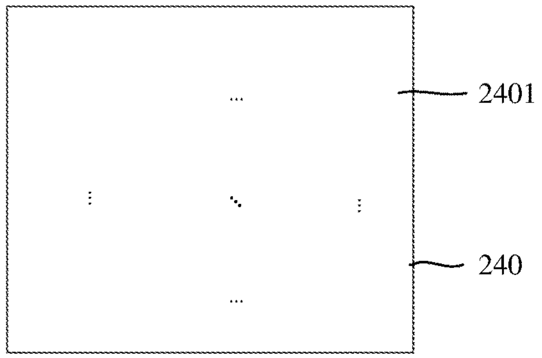
FIG. 5 a structural diagram of a laser device according to some embodiments.
Figure 10:
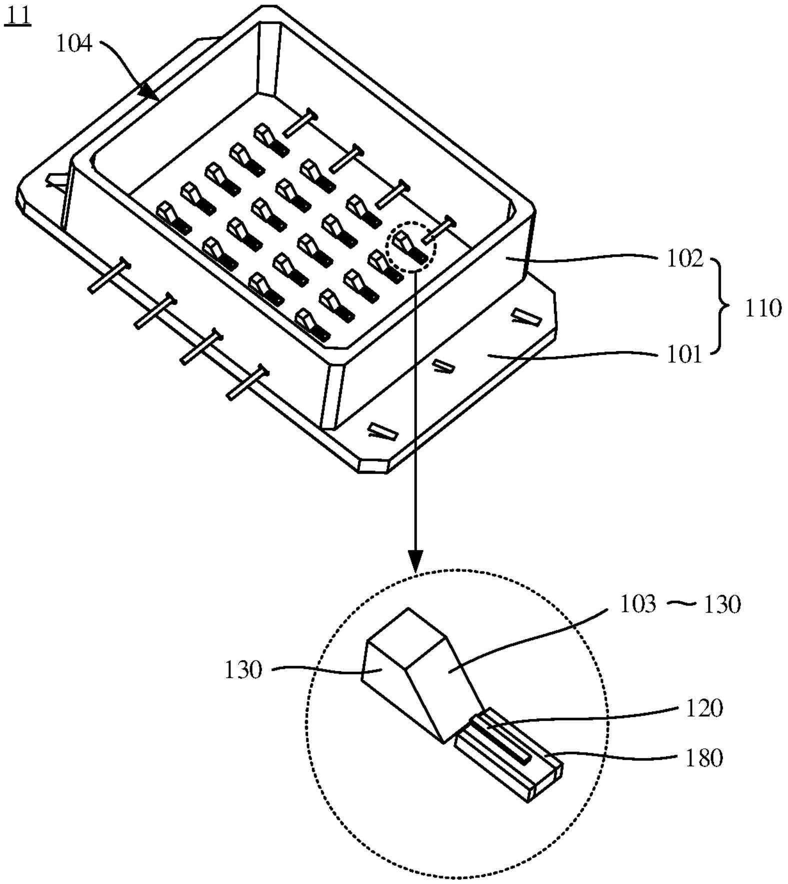
FIG. 10 is a structural diagram of a laser device according to some embodiments.
Figure 25:
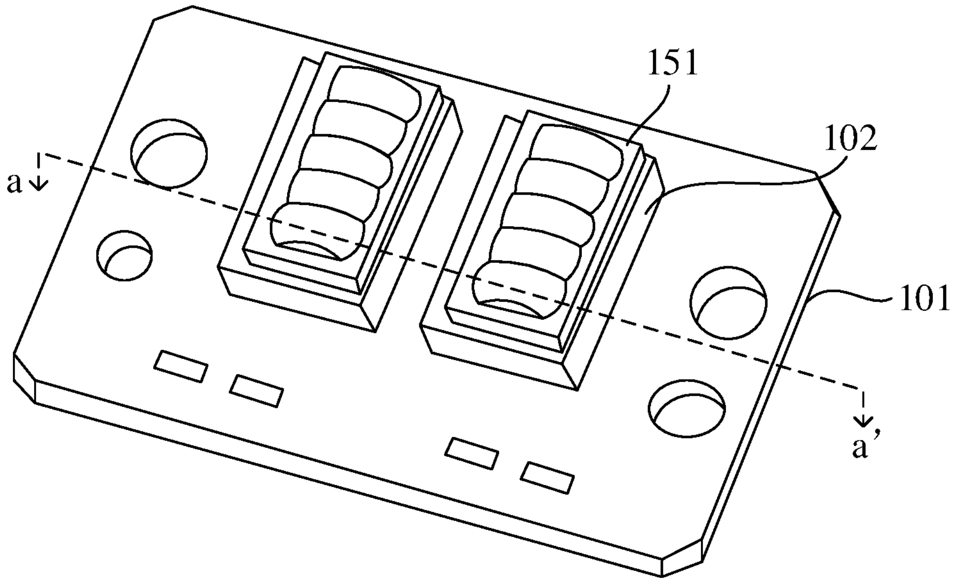
FIG. 25 is a structural diagram of a laser device according to some embodiments.
Figure 26:
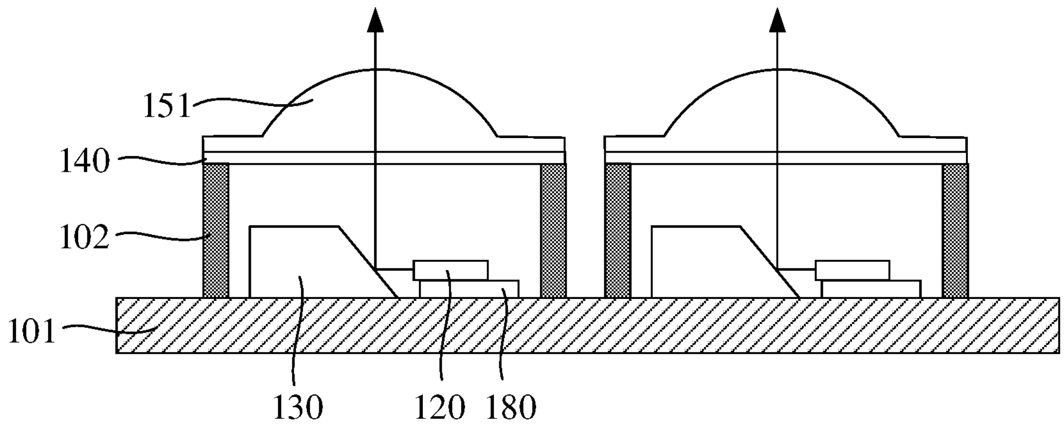
FIG. 26 is a cross-sectional view dissected along line a-a' in FIG. 25.

Exemplarily, referring to FIG. 5, the plurality of light-emitting chips (i.e., light-emitting components 120) are encapsulated in three different spaces on the base plate 101 via three packages; referring to FIG. 10, the plurality of light-emitting chips (i.e., light-emitting components 120) are encapsulated in the same space on the base plate 101 via a single package; referring to FIGS. 25 and 26, the plurality of light-emitting chips (i.e., light-emitting components 120) are encapsulated in the same space on the base plate 101 via two packages.

Figure 4:
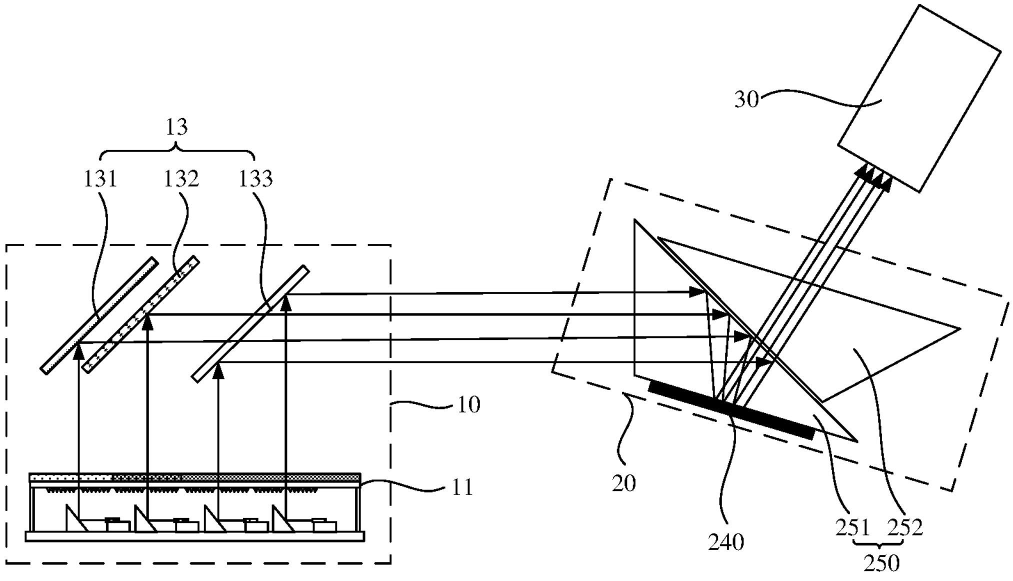
FIG. 4 is a diagram illustrating an optical path of a laser projection apparatus according to some embodiments.

FIG. 4 is a diagram illustrating an optical path of a laser projection apparatus according to some embodiments.

The illumination beam emitted by the light source assembly 10 enters the light modulating assembly 20. Referring to FIG. 4, the light modulating assembly 20 includes a digital micromirror device (DMD) 240 and a prism assembly 250. The prism assembly 250 reflects the illumination beam to the DMD 240, and the DMD 240 modulates the illumination beam to acquire the projection beam and reflects the projection beam into the projection lens 30.

In the light modulating assembly 20, the DMD 240 modulates the illumination beam provided by the light source assembly 10 with the image signal, i.e., the projection beam is controlled to display different luminance and gray scales for different pixels of a to-be-displayed image to eventually form an optical image. Therefore, the DMD 240 is also referred to as a light modulation device or a light valve. Depending on whether the light modulation device (or light valve) transmits or reflects the illumination beam, the light modulation device (or light valve) is classified as a transmissive light modulation device (or light valve) or a reflective light modulation device (or light valve). For example, the DMD 240 shown in FIG. 4, which reflects the illumination beam, is a reflective light modulation device. A liquid crystal light valve, which transmits the illumination beam, is a transmissive light modulation device. In addition, depending on the number of light modulation devices (or light valves) used in the light modulating assembly 20, the light modulating assembly 20 is classified as a single-chip system, a dual-chip system, or a triple-chip system. The light modulation device (or light valve) in some embodiments of the present disclosure is the DMD 240.

As shown in FIG. 4, the prism assembly 250 includes two prisms, i.e., a first prism 251 and a second prism 252 that are disposed opposite to each other. The first prism 251 and the second prism 252 are both total-reflection prisms. In the case that the illumination beam is incident on the first prism 251 at a predetermined angle, the incident angle of the illumination beam satisfies a total-reflection condition of the first prism 251, such that the first prism 251 reflects the illumination beam to the DMD 240 at a set angle. The illumination beam is modulated by the DMD 240 to be converted into the projection beam, which is incident on the first prism 251 again. In this case, an incident angle of the projection beam does not satisfy the total-reflection condition, such that the projection beam exits from the first prism 251 and is incident on the second prism 252. Then, the projection beam is refracted by the second prism 252 and then perpendicularly incident on the projection lens 30.

Figure 18:
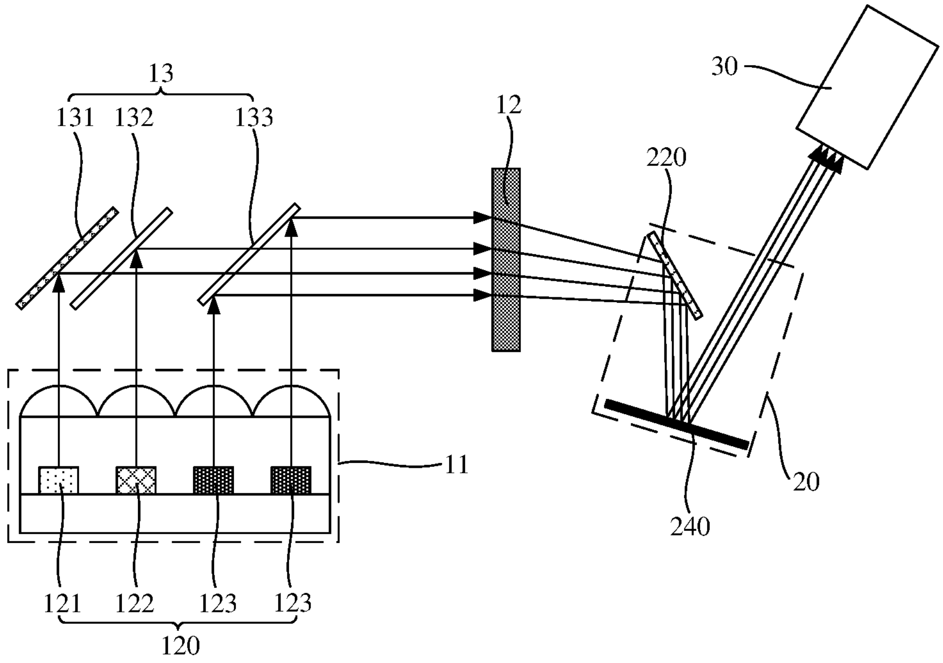
FIG. 18 is a diagram illustrating an optical path of still another laser projection apparatus according to some embodiments.

In addition, the prism assembly 250 may be replaced by a reflecting mirror 220 (as shown in FIG. 18). Upon being incident on the reflecting mirror 220 at a predetermined angle, the illumination beam is reflected by the reflecting mirror 220 to the DMD 240 at an incident angle satisfying the DMD 240.

Figure 6:
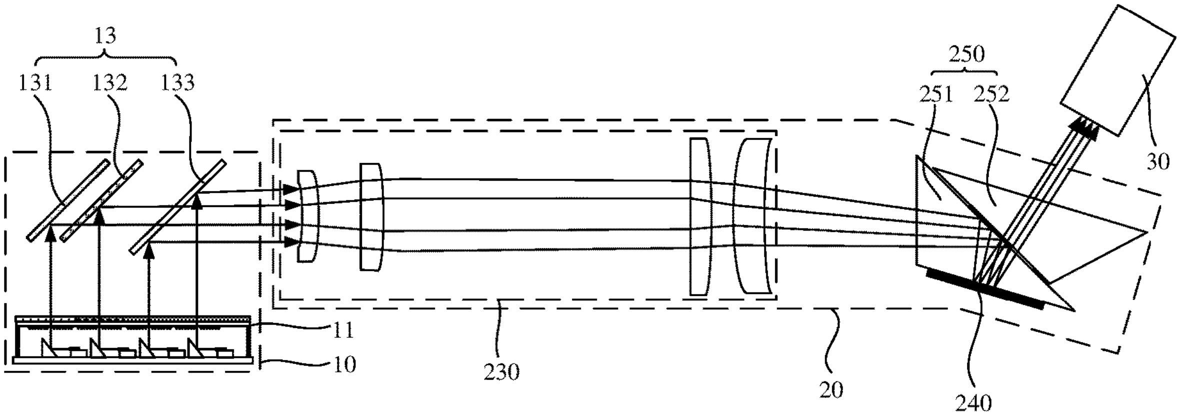
FIG. 6 is a diagram illustrating an optical path of another laser projection apparatus according to some embodiments.

FIG. 6 is a diagram illustrating an optical path of another laser projection apparatus according to some embodiments.

In some embodiments, as shown in FIG. 6, the light modulating assembly 20 further includes a lens assembly 230 disposed between the light source assembly 10 and the prism assembly 250. The lens assembly 230 is configured to collimate and then converge the incident illumination beam, before the illumination beam exits to the DMD 240, such that the use requirements of the DMD 240 are satisfied. The lens assembly 230 at the front end of the DMD 240 forms an illuminated optical path, and the illumination beam emitted by the light source assembly 10 passes through the illuminated optical path to form a beam size and an incident angle that satisfy the requirements of the DMD 240.

Figure 7:
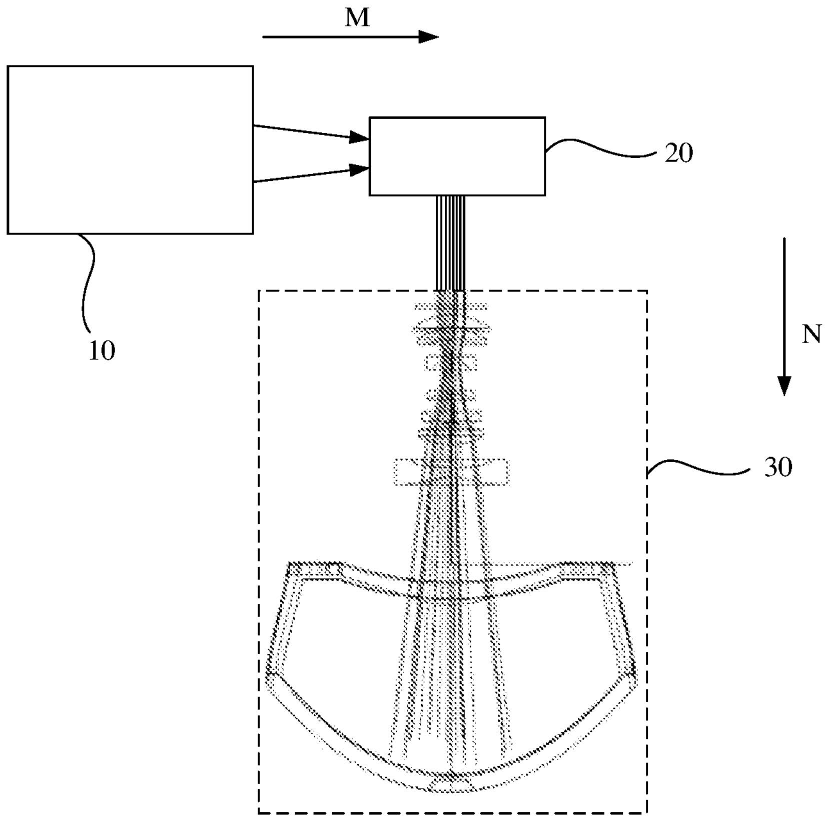
FIG. 7 is a diagram illustrating an optical path of still another laser projection apparatus according to some embodiments.

FIG. 7 is a diagram illustrating an optical path of still another laser projection apparatus according to some embodiments.

As shown in FIG. 7, the projection lens 30 includes a multi-lens combination, which is generally partitioned into groups, i.e., a front group, a middle group, and a rear group in a three-segment manner, or a front group and a rear group in a two-segment manner. The front group is a lens group proximal to a light-output side of the laser projection apparatus 1 (e.g., a side of the projection lens 30 distal from the light modulating assembly 20 along the N direction in FIG. 7), and the rear group is a lens group proximal to a light-output side of the light modulating assembly 20 (e.g., a side of the projection lens 30 proximal to the light modulating assembly 20 along a direction opposite to the N direction in FIG. 7). The projection lens 30 is a zoom lens, a fixed focus-variable lens, or a fixed focus lens.

For convenience of description, some embodiments of the present disclosure are mainly exemplified with the light source assembly 10 outputting lights of three primary colors in a time sequence, the laser projection apparatus 1 employing a DLP projection architecture, the laser device in the light source assembly 10 being the laser device with a multi-chip package structure, and the light modulation device in the light modulating assembly 20 being the DMD 240, which in turn are not to be construed as limiting the present disclosure.

The light source assembly 10 according to some embodiments of the present disclosure is described in detail below.

Figure 27:
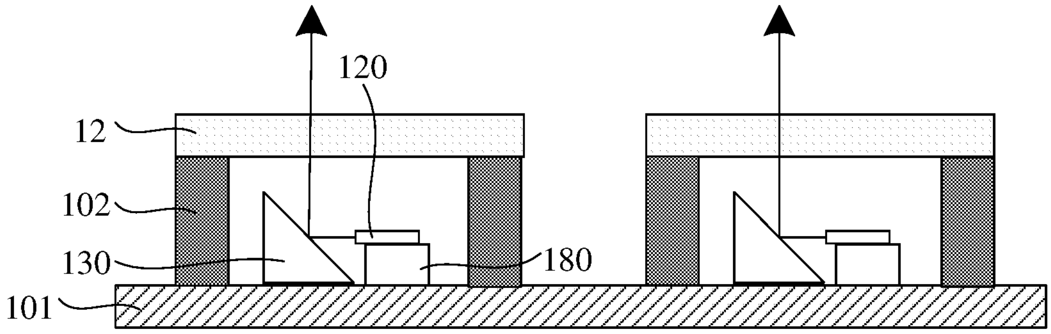
FIG. 27 is a structural diagram of a laser device according to some embodiments.

In some embodiments, as shown in FIG. 4, the light source assembly 10 includes a laser device 11, and the laser device 11 is configured to emit laser beams. It can be seen that the laser device 11 of FIG. 4 is provided with one package 110, and the plurality of light-emitting components 120 are encapsulated within the package 110. In other embodiments, as shown in FIG. 27, the laser device 11 may be provided with two packages 110, and a plurality of light-emitting components 120 are arranged in a row encapsulated within one package, and a plurality of light-emitting components 120 are arranged in a row encapsulated within the other package.

Figure 8:
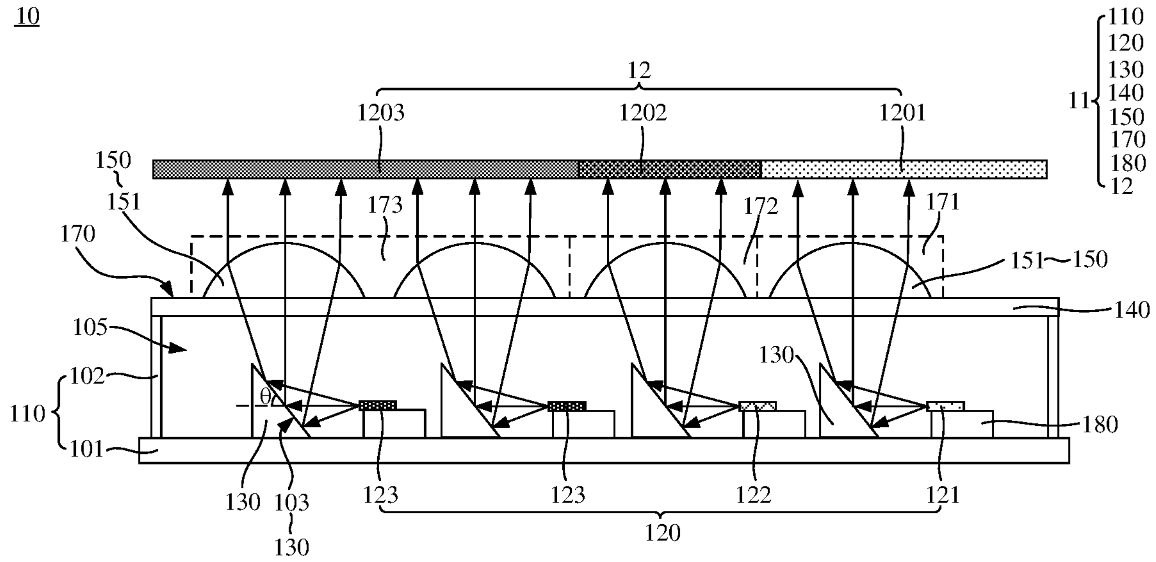
FIG. 8 is a structural diagram of a light source assembly according to some embodiments.
Figure 9:
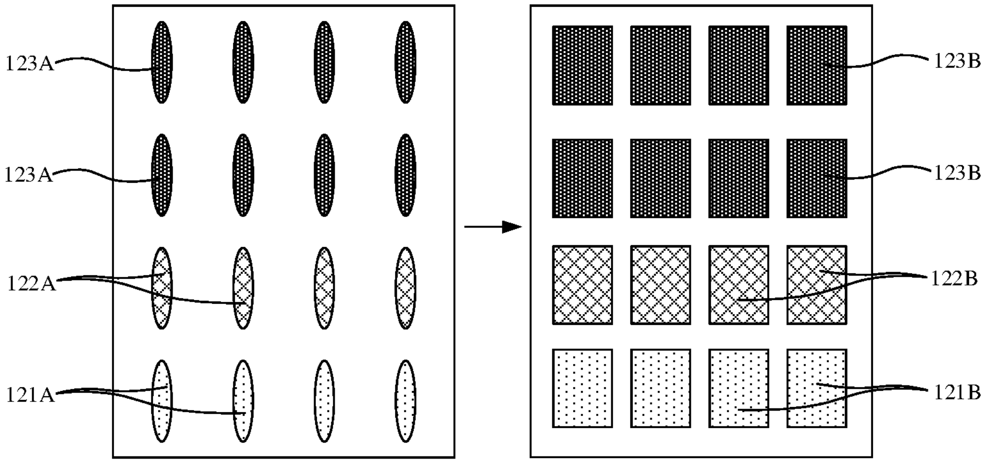
FIG. 9 is a schematic diagram of light spots of laser beams in FIG. 8 before and after the laser beams pass through a diffractive optical element.

FIG. 8 is a structural diagram of a light source assembly according to some embodiments. FIG. 9 is a schematic diagram of light spots of laser beams in FIG. 8 before and after the laser beams pass through a diffractive optical element. FIG. 10 is a structural diagram of a laser device according to some embodiments.

In some embodiments, as shown in FIG. 8, the laser device 11 includes a package 110, a plurality of light-emitting components 120, a reflecting prism 130, a light-transmitting layer 140, and a collimating lens group 150.

As shown in FIG. 10, the package 110 is configured to accommodate the plurality of light-emitting components 120, and the plurality of light-emitting components 120 are packaged within the package 110. The package 110 includes a base plate 101 and a frame 102. The frame 102 is disposed on the base plate 101 and surrounds the plurality of light-emitting components 120. For example, the frame 102 has a ring shape (e.g., a square ring shape) and is attached to the base plate 101, such that the base plate 101 and the frame 102 form an accommodating space 105 for accommodating the plurality of light-emitting components 120.

In some embodiments, the base plate 101 and the frame 102 are formed as an integral member or discrete members.

In some embodiments, as shown in FIG. 10, the plurality of light-emitting components 120 are disposed on the base plate 101 and configured to emit laser beams.

In some embodiments, the plurality of light-emitting components 120 include at least two of a plurality of first light-emitting components 121, a plurality of second light-emitting components 122, or a plurality of third light-emitting components 123. For example, as shown in FIG. 8, the plurality of light-emitting components 120 include the plurality of first light-emitting components 121, the plurality of second light-emitting components 122, and the plurality of third light-emitting components 123. The first light-emitting components 121 emit a first-color laser beam, the second light-emitting components 122 emit a second-color laser beam, and the third light-emitting components 123 emit a third-color laser beam. The first-color laser beam, the second-color laser beam, and the third-color laser beam are combined to form a white light, and the first-color laser beam, the second-color laser beam, and the third-color laser beam have different wavelengths.

For example, the first-color laser beam is a blue laser beam, the second-color laser beam is a green laser beam, and the third-color laser beam is a red laser beam. The present disclosure does not limit the colors of the first-color laser beam, the second-color laser beam, and the third-color laser beam, as long as the first-color laser beam, the second-color laser beam, and the third-color laser beam can be mixed to form the white light. In addition, the plurality of light-emitting components 120 may further emit laser beams of four colors or more, which is not limited in the present disclosure.

In the following description will be given by taking an example in which the first-color laser beam is the blue laser beam, the second-color laser beam is the green laser beam, and the third-color laser beam is the red laser beam.

In some embodiments, the plurality of light-emitting components 120 are arranged in an array. For example, the plurality of first light-emitting components 121 are arranged in an array of 1×4, the plurality of second light-emitting components 122 are arranged in an array of 1×4, and the plurality of third light-emitting components 123 are arranged in an array of 2×4. As such, a row of the first light-emitting components 121, a row of the second light-emitting components 122, and two rows of the third light-emitting components 123 are arranged in sequence to constitute an array of 4×4. In addition, the plurality of first light-emitting components 121, the plurality of second light-emitting components 122, and the plurality of third light-emitting components 123 may be arranged in other arrays. The plurality of light-emitting components 120 in different arrays correspond to different overall light-emitting powers of the laser device 11, which are selected as needed.

It should be noted that human eyes have different sensitivities to lights of different wavelengths. For example, human eyes have a high sensitivity to a green light and a low sensitivity to a red light and a violet light. Therefore, in the laser projection apparatus 1, the number of the light-emitting components 120 emitting the red laser beam (such as the third light-emitting components 123) is greater than the number of the light-emitting components 120 emitting laser beams of other colors in the laser device 11.

In some embodiments, a light-output surface 170 of the laser device 11 includes at least two of a first light-output area 171, a second light-output area 172, or a third light-output area 173, and the light-output areas correspond respectively to the light-emitting components 120 emitting the laser beams of different colors. For example, the light-output surface 170 of the laser device 11 includes the first light-output area 171, the second light-output area 172, and the third light-output area 173. In FIG. 8, the light-output areas are separated by dotted lines for convenience of distinction. The plurality of first light-emitting components 121 arranged in the array correspond to the first light-output area 171, the plurality of second light-emitting components 122 arranged in the array correspond to the second light-output area 172, and the plurality of third light-emitting components 123 arranged in the array correspond to the third light-output area 173. As such, the first light-output area 171 is configured to allow the first-color laser beam to exit; the second light-output area 172 is configured to allow the second-color laser beam to exit; and the third light-output area 173 is configured to allow the third-color laser beam to exit.

In some embodiments, as shown in FIG. 8 and FIG. 10, the laser device 11 further includes a heat sink 180. The light-emitting components 120 are disposed at a side of the heat sink 180 distal from the base plate 101, and attached to the base plate 101 by the corresponding heat sink 180. Through the heat sink 180, the heat generated while the light-emitting components 120 emit the laser beams is quickly conducted to the base plate 101 to dissipate heat from the light-emitting components 120.

In some embodiments, as shown in FIG. 8 and FIG. 10, the reflecting prism 130 is disposed on the base plate 101. The reflecting prism 130 corresponds to at least one of the light-emitting components 120, and the reflecting prism 130 is disposed at a light-output side of the corresponding one of the light-emitting components 120 and configured to reflect the laser beam emitted by the corresponding one of the light-emitting components 120, such that the laser beam reflected by the reflecting prism 130 exits toward the light-output area corresponding to the one of the light-emitting components 120. For example, the first-color laser beam emitted by the first light-emitting components 121 is reflected by the reflecting prism 130 and incident on the first light-output area 171, and exits from the first light-output area 171.

In some embodiments, as shown in FIG. 8 and FIG. 10, the reflecting prism 130 includes a reflecting surface 103, and the reflecting surface 103 is a surface of the reflecting prism 130 facing the corresponding one of the light-emitting components 120, for reflecting the laser beam emitted by the corresponding one of the light-emitting components 120.

In some embodiments, as shown in FIG. 8, a preset included angle θ is formed between the reflecting surface 103 and a light-output direction of the corresponding one of the light-emitting components 120, and the preset included angle θ is 45°. As such, the light-output position of the laser beam reflected by the reflecting prism 130 is adjusted by adjusting the position of the reflecting prism 130, which is conducive to reducing the error of the optical system.

In some embodiments, as shown in FIG. 8, the light-transmitting layer 140 is disposed at a side of the frame 102 distal from the base plate 101 to enclose the accommodating space 105. For example, as shown in FIG. 10, the side of the frame 102 distal from the base plate 101 is open to form an opening 104, and the light-transmitting layer 140 is configured to enclose the opening 104. The light-transmitting layer 140 is made of a light-transmitting material (e.g., glass or resin) to transmit the laser beams emitted by the light-emitting components 120.

In some embodiments, the edge of the light-transmitting layer 140 is adhered to a surface of the frame 102 distal from the base plate 101, or the light-transmitting layer 140 is fixed on the frame 102 by other components.

In some embodiments, as shown in FIG. 8, the collimating lens group 150 is disposed at a side of the light-transmitting layer 140 distal from the light-emitting components 120 and configured to collimate the incident laser beams. For example, the collimating lens group 150 includes an aspheric lens that is fixed on the light-transmitting layer 140.

In some embodiments, the collimating lens group 150 is an integral member, or as shown in FIG. 8, the collimating lens group 150 includes a plurality of collimating lenses 151 that are disposed independently.

In some embodiments, as shown in FIG. 8, the laser device 11 further includes a diffractive optical element (DOE) 12. The diffractive optical element 12 is configured to shape (e.g., homogenize) the laser beams emitted by the plurality of light-emitting components 120, such that the shaped laser beams are converted into rectangular light spots with a uniform intensity distribution. Moreover, the rectangular light spots formed through the diffractive optical element 12 are matched with a light-receiving surface of the DMD 240.

For example, the light-receiving surface of the DMD 240 is generally in rectangular, an aspect ratio of the rectangular light spots formed through the diffractive optical element 12 is equal to or substantially equal to an aspect ratio of the light-receiving surface of the DMD 240, and the rectangular light spots cover the light-receiving surface of the DMD 240, such that the entire light-receiving surface of the DMD 240 is irradiated with the laser beams, improving the transmission efficiency of the light modulation device (light valve) on the laser beam emitted by the light source assembly 10. In addition, as the laser beam shaped by the light-guiding member 12 can be directly incident on the surface of the DMD 240, the DMD 240, the structure of an illuminated system disposed before the DMD 240 can be omitted, such as a lens combination, thereby simplifying the structure of the optical path system.

Figure 11:
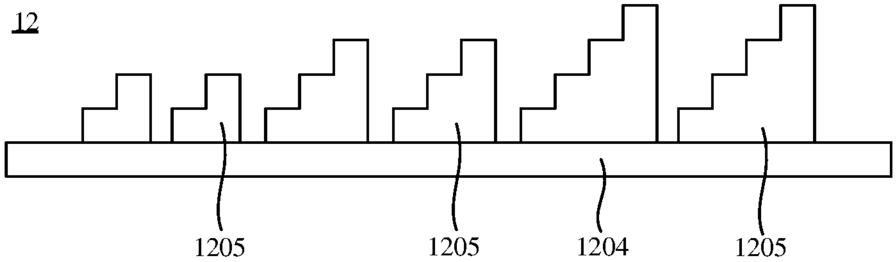
FIG. 11 is a structural diagram of a diffractive optical element according to some embodiments.
Figure 12:
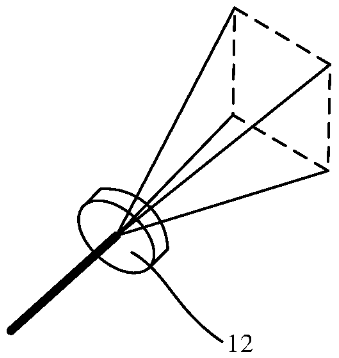
FIG. 12 is a schematic diagram of a light spot of a laser beam after the laser beam passes through a diffractive optical element according to some embodiments.

FIG. 11 is a structural diagram of a diffractive optical element according to some embodiments. FIG. 12 is a schematic diagram of a light spot of a laser beam after the laser beam passes through a diffractive optical element according to some embodiments.

In some embodiments, as shown in FIG. 11, the diffractive optical element 12 includes a substrate 1204 and a plurality of diffractive portions 1205. The plurality of diffractive portions 1205 are disposed on the substrate 1204, and the plurality of diffractive portions 1205 are arranged in a two-dimensional matrix. The plurality of diffractive portions 1205 are in a step shape, and the plurality of diffractive portions 1205 have different heights, such that phase changes of the laser beams are different while the laser beams transmit through different diffractive portions 1205, regulating the wavefront phases of the laser beams. As such, the laser beams are diffracted by the diffractive portions 1205 and interfere at a distance, resulting in light spots with a uniform intensity distribution and a specific shape.

For example, the plurality of diffractive portions 1205 are formed by using a micro-nano etching process. Moreover, the plurality of diffractive portions 1205 may respectively have different shapes, sizes, or refractive indexes to correspond to wavelengths, intensities, or incident angles of the laser beams.

Referring to FIG. 11, in the case where the plurality of diffractive sections 1205 are in the step form, the number of the plurality of diffractive portions 1205 may be an exponential multiple of 2. For example, the number of the plurality of diffractive portions 1205 may be 4 or 8 or 16. The greater the number of the plurality of diffractive portions 1205, the more difficult the manufacturing and processing will be, corresponding to a higher maximum diffraction efficiency. For laser beams of different wavelengths, the heights of the corresponding diffracting portions 1205 are different.

Exemplarily, assuming that the number of diffractive portions 1205 is k, the refractive index of the laser beam is n, and the wavelength of the laser beam is, the formula for calculating the height h of each diffractive portion 1205 may be:

$$h = \frac{\lambda}{(2 * k * (n - 1))};$$

In a specific embodiment, in the case that the diffraction portion 1205 is provided with a diffraction partition corresponding to the red laser beam emission region, the number of the diffraction portions 1205 is 16, the refractive index of the laser beam is 1.5 (at this time, the material of the diffraction portions 1205 is glass), the wavelength corresponding to the diffractive portions 1205 is 640 nm, the height of the step corresponding to each diffraction portion 1205 is 40 nm; in a specific embodiment, in the case that the number of the diffracting portions 1205 is 16, the refractive index of the laser beam is 1.5 (at this time, the material of the diffraction portions 1205 is glass), the wavelength corresponding to the diffractive portions 1205 is 530 nm, the height of the step corresponding to each diffracting portion 1205 may be 33.2 nm.

The size of the diffraction portion 1205 correspond to imaging of light spots of the laser beam emitted from the laser device, so as to ensure that all lights spots are covered by the diffraction portions 1205 of the corresponding wavelength.

A distance between the diffractive portion 1205 and the opening 104 of the frame 102 ranges from 1 mm to 100 mm, and the light spots of the laser beams irradiated onto the diffractive portions 1205 do not overlap, that is, the light spots of the light-emitting components 120 in each laser device irradiated onto the diffractive portions 1205 are independent.

A size of the light spot illuminated onto the diffractive portion 1205 and a optical path length between the diffractive portion 1205 and the DMD 240 can determine illumination F-number, which can be determined according to the following equation:

Illumination F number=a diameter d of an outer circle where a light spot of a laser beam is located/an optical path length l between the diffraction portion 1205 and the DMD 240;

In addition, a focusing lens may also be disposed between the diffraction portion 1205 and the DMD 240 for converging the laser beam onto the DMD 240. By providing the focusing lens, the design of the diffraction portion 1205 can be simpler. Generally, the focusing lens is close to the diffraction portion 1205, and a distance between the focusing lens and the diffraction portion 1205 ranges from 1 mm to 50 mm. The focal length of the focusing lens determines the illumination F-number and is proportional to the illumination F-number. That is, the larger the focal length of the focusing lens is, the larger the illumination F-number is; and the smaller the focal length of the focusing lens is, the smaller the illumination F-number is.

For example, parameters (such as the shapes, sizes, or refractive indexes) corresponding to the plurality of diffractive portions 1205 in the diffractive optical element 12 are calculated through a diffraction theory, an optimization algorithm (such as Gale-Shapley algorithm), a simulated annealing algorithm, and a genetic algorithm (GA), according to amplitude distributions of the laser beams incident on the diffractive optical element 12, phases of the incident laser beams, and desired amplitude distributions of the laser beams.

As such, through the diffractive portions 1205 in the diffractive optical element 12, the light spots of the laser beams after the laser beams pass through the diffractive optical element 12 are converted into rectangular light spots with a uniform intensity distribution (as shown in FIG. 12), such that the use requirements of the laser projection apparatus 1 are satisfied.

It should be noted that the parameters of the plurality of diffractive portions 1205 may also be adjusted according to the arrangement of the plurality of light-emitting components 120 to acquire desired rectangular light spots. Therefore, some embodiments of the present disclosure do not limit the arrangement of the plurality of light-emitting components 120, as well as the parameters of the diffractive optical element 12.

In some embodiments, the adjustment of the parameters of the plurality of diffractive portions 1205 in the diffractive optical element 12 enables a uniform intensity distribution of the light spots of the laser beams diffracted by the diffractive optical element 12, such that the sizes of the light spots satisfy the use requirements of the DMD 240. As such, the laser beams shaped by the diffractive optical element 12 are directly incident on the DMD 240 through the prism assembly 250 as the illumination beam of the light source assembly 10, simplifying the illumination optical path. In addition, the laser beams shaped by the diffractive optical element 12 may be incident on the prism assembly 250 and the DMD 240 after passing through the lens assembly 230.

In some embodiments of the present disclosure, by providing the diffractive optical element 12 in the laser device 11 to shape and homogenize the laser beams, the desired light spots with a uniform intensity distribution and a specific shape are acquired, such that components, such as a light pipe and a diffuser, are not needed in the laser projection apparatus 1, which reduces the loss of the laser beams, simplifies the structure of the optical system in the laser projection apparatus 1, and facilitates the miniaturization of the laser projection apparatus 1. Moreover, the intensity distribution of the light spots is homogenized, which facilitates speckle elimination.

It should be noted that the laser beams exiting from the light source assembly 10 and shaped and homogenized by the diffractive optical element 12 are directly incident into the light modulating assembly 20 as the illumination beam emitted by the light source assembly 10.

In some embodiments, as shown in FIG. 8, the diffractive optical element 12 includes a first diffractive area 1201, a second diffractive area 1202, and a third diffractive area 1203. The first diffractive area 1201 is disposed at a light-output side of the first light-output area 171, and the first diffractive area 1201 is disposed corresponding to a wavelength and a divergence angle of the first-color laser beam. The first diffractive area 1201 is configured to shape and homogenize the first-color laser beam and transmit a light spot of the shaped first-color laser beam to a first position. The second diffractive area 1202 is disposed at a light-output side of the second light-output area 172, and the second diffractive area 1202 is disposed corresponding to a wavelength and a divergence angle of the second-color laser beam. The second diffractive area 1202 is configured to shape and homogenize the second-color laser beam and transmit a light spot of the shaped second-color laser beam to a second position. The third diffractive area 1203 is disposed at a light-output side of the third light-output area 173, and the third diffractive area 1203 is disposed corresponding to a wavelength and a divergence angle of the third-color laser beam. The third diffractive area 1203 is configured to shape and homogenize the third-color laser beam and transmit a light spot of the shaped third-color laser beam to a third position.

It should be noted that the first position, the second position, and the third position mentioned above refer to a distance between the centers of the light spots being less than or equal to 3 mm.

As shown in FIG. 9, a first light spot 121A of the first-color laser beam emitted by the first light-emitting components 121 before the first-color laser beam is incident on the first diffractive area 1201, a second light spot 122A of the second-color laser beam emitted by the second light-emitting components 122 before the second-color laser beam is incident on the second diffractive area 1202, and a third light spot 123A of the third-color laser beam emitted by the third light-emitting components 123 before the third-color laser beam is incident on the third diffractive area 1203 have Gaussian distributions, respectively, and the light spots are elliptical. After being shaped by the first diffractive area 1201, the first light spot 121A of the first-color laser beam is converted into a fourth light spot 121B with a uniform intensity distribution. After being shaped by the second diffractive area 1202, the second light spot 122A of the second-color laser beam is converted into a fifth light spot 122B with a uniform intensity distribution. After being shaped by the third diffractive area 1203, the third light spot 123A of the third-color laser beam is converted into a sixth light spot 123B with a uniform intensity distribution. Moreover, the fourth light spot 121B, the fifth light spot 122B, and the sixth light spot 123B are rectangular.

The laser beams of different colors have different light spot sizes, wavelengths, and divergence angles. Therefore, by providing the diffractive areas corresponding to the laser beams of different colors, the diffraction efficiency of the diffractive optical element 12 is improved, the accuracy of shaping of the light spots of the laser beams by the diffractive optical element 12 is improved, and the uniformity of intensity distribution of the light spots is improved. As such, the laser beams of different colors are shaped into rectangular light spots with a uniform intensity distribution and the same size, which satisfies the use requirements of the laser projection apparatus 1 and is conducive to improving the coincidence degree of the light spots and the display effect of the projection picture.

Figure 13:
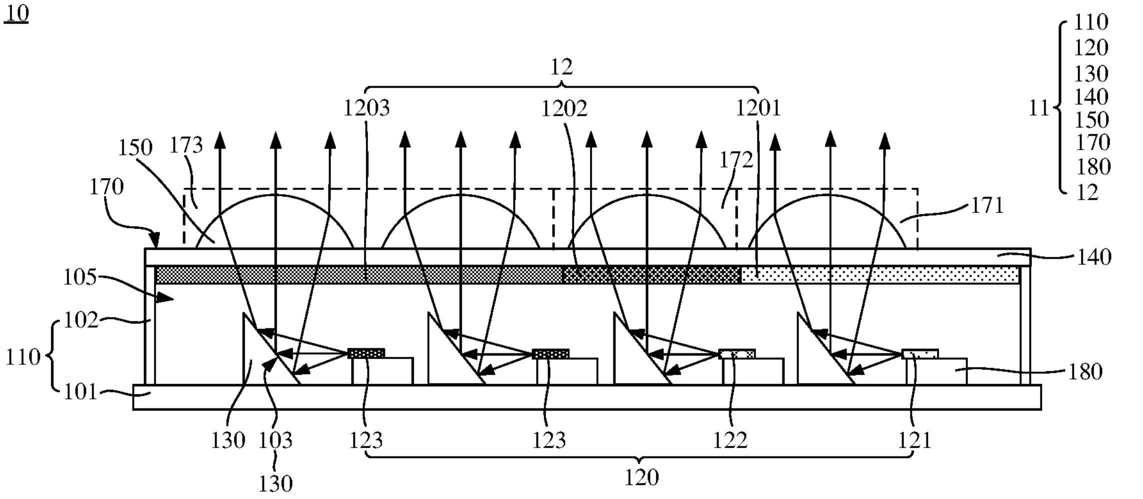
FIG. 13 is a structural diagram of another light source assembly according to some embodiments.
Figure 14:
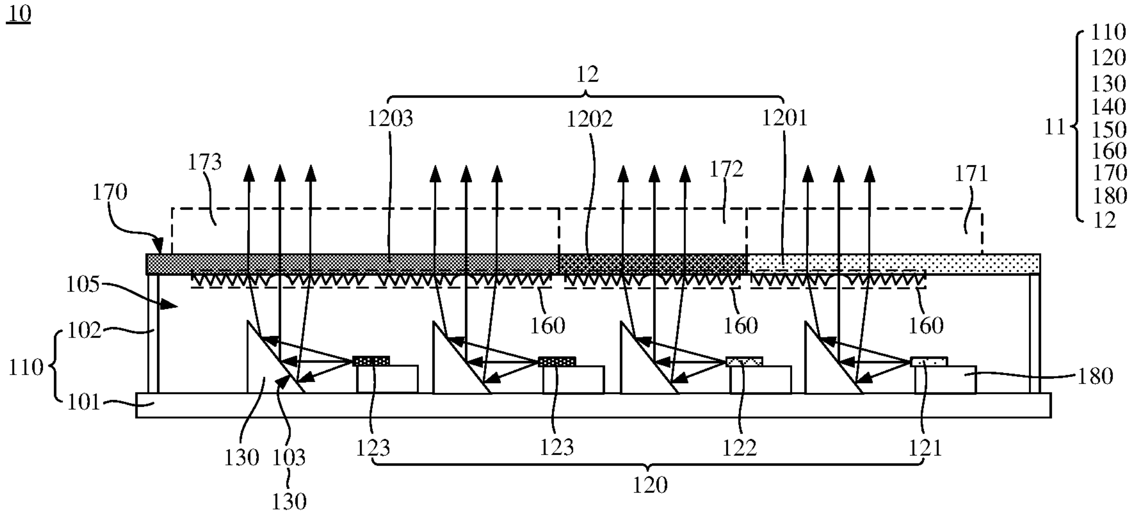
FIG. 14 is a structural diagram of still another light source assembly according to some embodiments.

FIG. 13 is a structural diagram of another light source assembly according to some embodiments. FIG. 14 is a structural diagram of still another light source assembly according to some embodiments. Here, in contrast to FIG. 8, the diffractive optical element 12 is integrally packaged with the laser device 11 in FIG. 13 and FIG. 14.

In some embodiments, the diffractive optical element 12 is disposed in the accommodating space 105. As such, the diffractive optical element 12 is packaged in the laser device 11.

For example, as shown in FIG. 13, the diffractive optical element 12 is disposed at a side of the light-transmitting layer 140 proximal to the light-emitting components 120. As such, the diffractive optical element 12 is packaged inside the laser device 11 to protect the diffractive optical element 12, such that the service life of the diffractive optical element 12 is increased.

Still for example, as shown in FIG. 14, the diffractive optical element 12 is light transmissive, instead of the light-transmitting layer 140, is disposed at the side of the frame 102 distal from the base plate 101 to enclose the accommodating space 105, such that the light-emitting components 120 are packaged, and the structure of the laser device 11 is simplified, which is conducive to miniaturization of the laser device 11.

In this case, the collimating lens group 150 is replaced by a Fresnel structure 160. For example, as shown in FIG. 14, the laser device 11 includes the Fresnel structure 160. The Fresnel structure 160 is disposed on a surface of the diffractive optical element 12 proximal to the light-emitting components 120 (e.g., a surface of the substrate 1204 distal from the plurality of diffractive portions 1205), and the Fresnel structure 160 is configured to collimate the incident laser beams. As such, the diffractive optical element 12 both collimates the laser beams and shapes and homogenizes the laser beams without additionally providing the collimating lens group 150, further simplifying the structure of the laser device 11, which is conducive to the miniaturization of the laser device 11. Moreover, the Fresnel structure 160 is disposed at a light-incident side of the diffractive optical element 12, such that the parallelism of the laser beams incident on the diffractive optical element 12 is improved, which is conducive to improving the diffraction efficiency of the diffractive optical element 12.

In addition, in the case that the laser device 11 includes the light-transmitting layer 140, the collimating lens group 150 may be replaced by the Fresnel structure 160. For example, the Fresnel structure 160 is disposed at the side of the light-transmitting layer 140 proximal to the light-emitting components 120, and the diffractive optical element 12 is disposed at the side of the light-transmitting layer 140 distal from the light-emitting components 120.

However, some embodiments of the present disclosure are not limited thereto. In some embodiments, as shown in FIG. 8, the diffractive optical element 12 is disposed at a side of the light-output surface 170 of the laser device 11 distal from the light-emitting components 120. As such, the diffractive optical element 12 is disposed after the laser device 11 is packaged, without changing the package structure of the laser device 11, which facilitates mounting and dismounting of the diffractive optical element 12.

Figure 15:
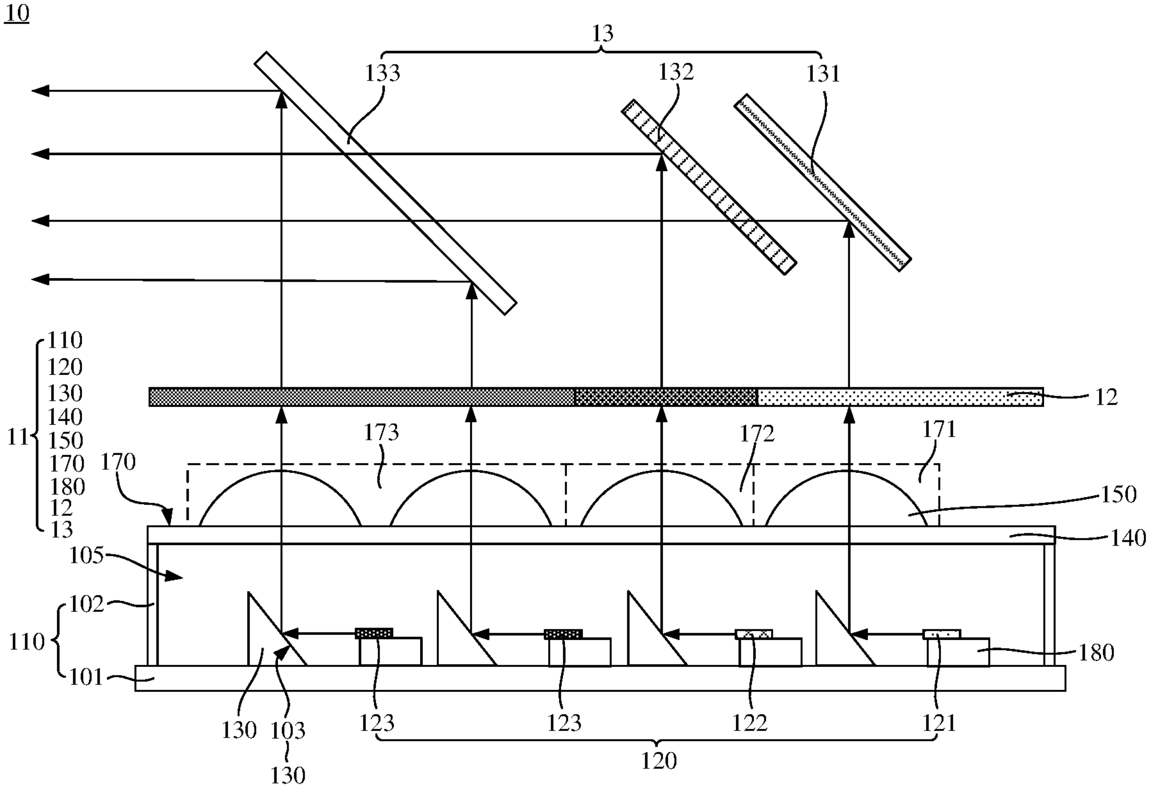
FIG. 15 is a structural diagram of still another light source assembly according to some embodiments.
Figure 16:
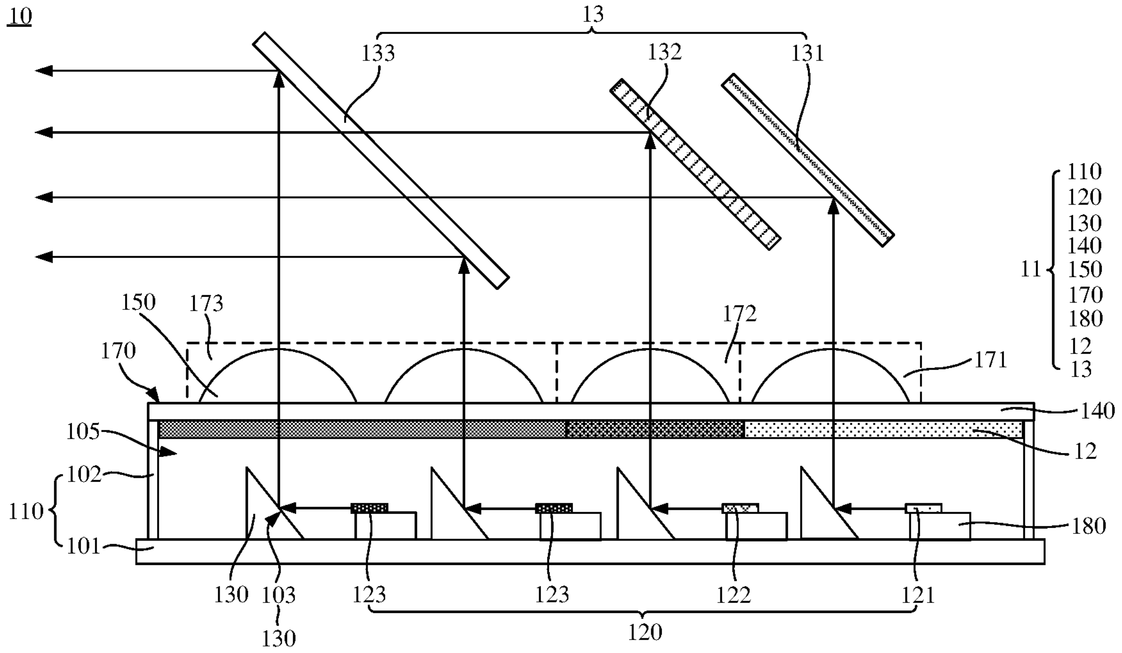
FIG. 16 is a structural diagram of still another light source assembly according to some embodiments.
Figure 28:
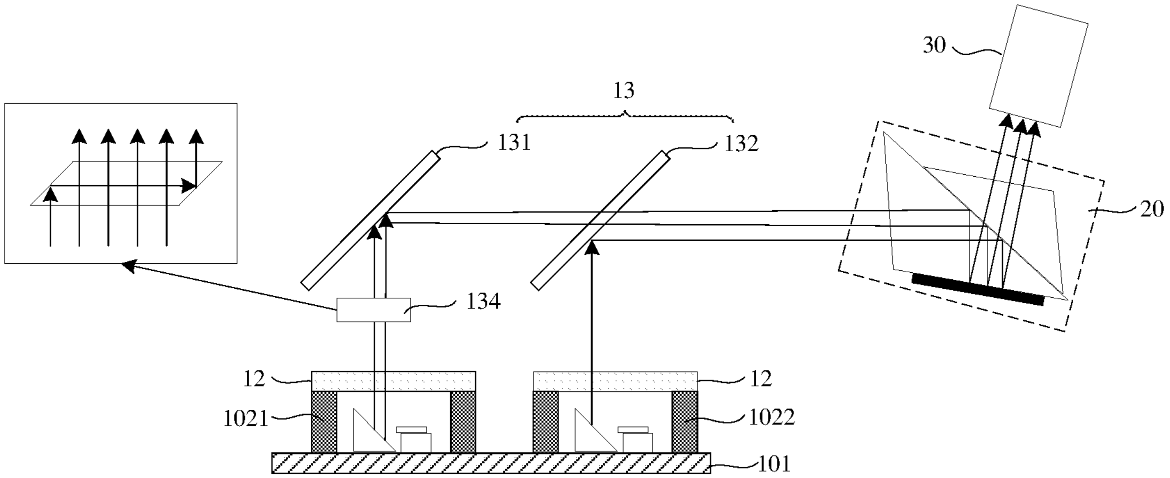
FIG. 28 is a diagram illustrating an optical path of still another laser projection apparatus according to some embodiments.
Figure 29:
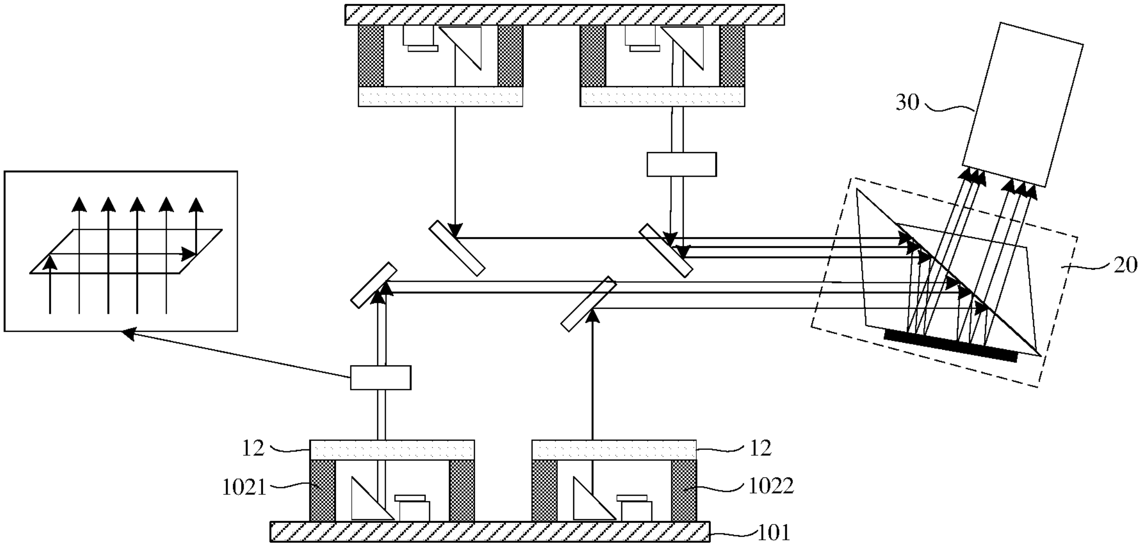
FIG. 29 is a diagram illustrating an optical path of still another laser projection apparatus according to some embodiments.
Figure 30:
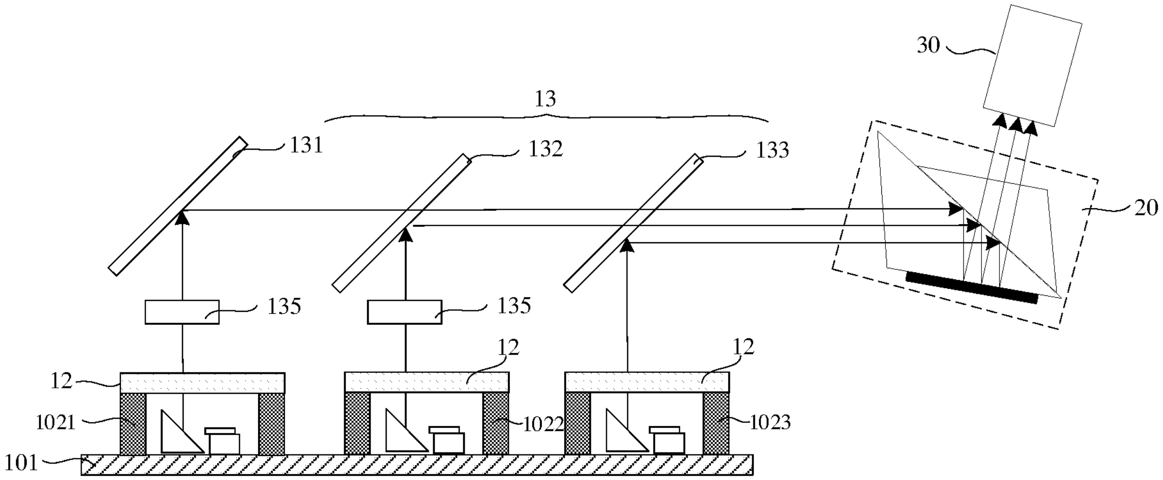
FIG. 30 is a diagram illustrating an optical path of still another laser projection apparatus according to some embodiments.
Figure 31:
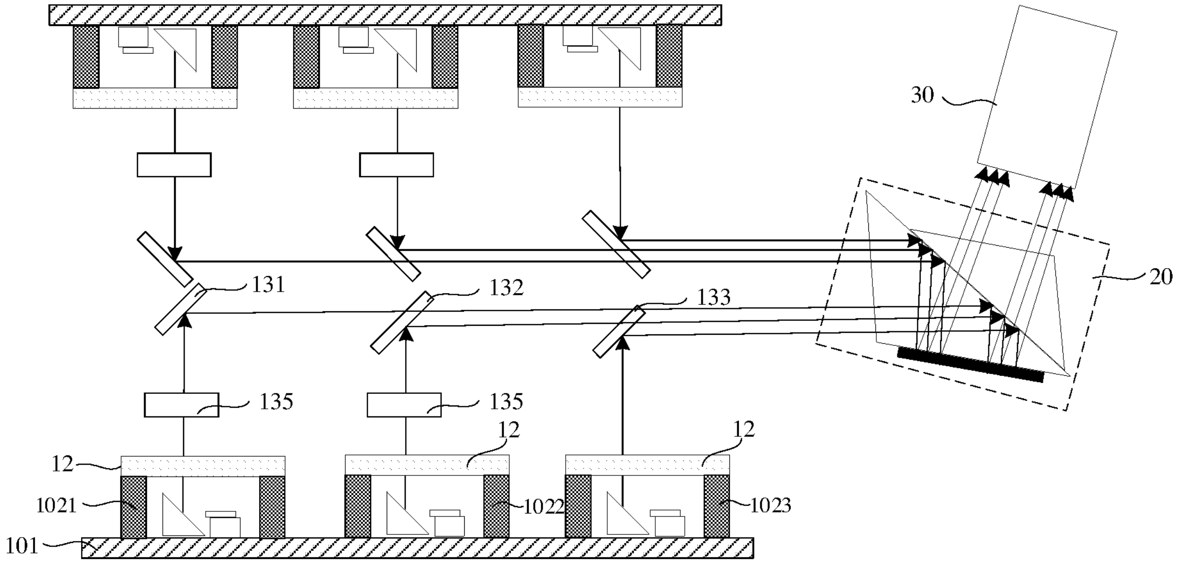
FIG. 31 is a diagram illustrating an optical path of still another laser projection apparatus according to some embodiments.

FIG. 15 is a structural diagram of still another light source assembly according to some embodiments. FIG. 16 is a structural diagram of still another light source assembly according to some embodiments. FIG. 28 is a diagram illustrating an optical path of still another laser projection apparatus according to some embodiments. FIG. 29 is a diagram illustrating an optical path of still another laser projection apparatus according to some embodiments. FIG. 30 is a diagram illustrating an optical path of still another laser projection apparatus according to some embodiments. FIG. 31 is a diagram illustrating an optical path of still another laser projection apparatus according to some embodiments. In contrast to FIG. 8, a first light-combining mirror group 13 is added to the light source assembly 10 in FIG. 15, FIG. 16, FIG. 28, FIG. 29, FIG. 30, and FIG. 31. In FIG. 15, the diffractive optical element 12 is provided on a side of the light-transmitting layer 140 distal from the light-emitting component 120; in FIG. 16, the diffractive optical element 12 is provided on a side of the light-transmitting layer 140 proximal to the light-emitting component 120; and in FIG. 28, FIG. 29, FIG. 30, and FIG. 31, the diffractive optical element 12, instead of the light-transmitting layer 140, is disposed at the side of the frame 102 distal from the base plate 101.

In some embodiments, as shown in FIG. 15, FIG. 16, FIG. 28, FIG. 29, FIG. 30, and FIG. 31, the laser device 11 further includes the first light-combining mirror group 13. The first light-combining mirror group 13 is disposed at a light-output side of the diffractive optical element 12, and is configured to combine the first-color laser beam, the second-color laser beam, and the third-color laser beam shaped by the diffractive optical element 12. The first light-combining mirror group 13 includes a plurality of light-combining mirrors corresponding respectively to different light-output areas in the laser device 11.

For example, as shown in FIG. 15 and FIG. 16, the first light-combining mirror group 13 includes a first light-combining mirror 131, a second light-combining mirror 132, and a third light-combining mirror 133. The first light-combining mirror 131 is disposed at the light-output side of the first light-output area 171; the second light-combining mirror 132 is disposed at an intersection of the first-color laser beam reflected by the first light-combining mirror 131 with the second-color laser beam exiting from the second light-output area 172; and the third light-combining mirror 133 is disposed at an intersection of the laser beam exiting from the second light-combining mirror 132 with the third-color laser beam exiting from the third light-output area 173.

The first light-combining mirror 131 is configured to reflect the first-color laser beam exiting from the first light-output area 171 to the second light-combining mirror 132. The second light-combining mirror 132 is configured to transmit the first-color laser beam and reflect the second-color laser beam exiting from the second light-output area 172. The third light-combining mirror 133 is configured to transmit the first-color laser beam and the second-color laser beam exiting from the second light-combining mirror 132 and reflect the third-color laser beam exiting from the third light-output area 173. As such, the first-color laser beam, the second-color laser beam, and the third-color laser beam are combined, and the combined laser beams exit from a side of the third light-combining mirror 133.

For another example, as shown in FIG. 28, the first light-combining mirror group 13 includes a first light-combining mirror 131 and a second light-combining mirror 132. The first light-combining mirror 131 is encapsulated in a corresponding light-output region of the first package and is disposed on a side of the first frame 1021 of the first package distal from the base plate 101; the second light-combining mirror 132 is encapsulated in a corresponding light-output region of the second package and is disposed on a side of the second frame 1022 of the second package distal from the base plate 101. The first light-combining mirror 131 is configured to reflect the first color laser beam and the second color laser beam exiting from the diffractive optical element 12 corresponding to the first frame 1021 to the second light-combining mirror 132. The second light-combining mirror 132 is configured to transmit the first color laser beam and the second color laser beam and reflect the third color laser beam exiting from the diffractive optical element 12 corresponding to the second frame 1022. As such, the first color laser beam, the second color laser beam, and the third color laser beam can be combined, and the combined laser beams exit from a side of the second light-combining mirror 132.

Continuing to refer to FIG. 28, the first light-combining mirror group 13 may further include an optical path conversion mirror 134. The optical path conversion mirror 134 is provided between the diffractive optical element 12 corresponding to the first frame 1021 and the first light-combining mirror 131, and is configured to convert the output position of a portion of the first-color laser beams, for example, by transforming a portion of the first-color laser beams that are originally disposed on a first side of the second-color laser beams into a second side of the second-color laser beams, the first side being opposite the second side, such that the second-color laser beams are disposed symmetrically on both side of the second-color laser beams to achieve a central symmetry of the laser beams.

For another example, as shown in FIG. 29, in contrast to FIG. 28, the number of laser devices 11 is increased. In this case, the laser devices 11 include two of the above-mentioned laser devices 11 and the two laser devices 11 are disposed opposite each other.

For another example, as shown in FIG. 30, the first light-combining mirror group 13 includes a first light-combining mirror 131, a second light-combining mirror 132, and a third light-combining mirror 133. The first light-combining mirror 131 is encapsulated in a corresponding light-output region of the first package and is disposed on a side of the first frame 1021 of the first package distal from the base plate 101; the second light-combining mirror 132 is encapsulated in a corresponding light-output region of the second package and is disposed on a side of the second frame 1022 of the second package distal from the base plate 101; the third light-combining mirror 133 is encapsulated in a corresponding light-output region of the third package and is disposed on a side of the third frame 1023 of the third package distal from the base plate 101. The first light-combining mirror 131 is configured to reflect the first color laser beam exiting from the diffractive optical element 12 corresponding to the first frame 1021 to the second light-combining mirror 132. The second light-combining mirror 132 is configured to transmit the first color laser beam and reflect the second color laser beam exiting from the diffractive optical element 12 corresponding to the second frame 1022. The third light-combining mirror 133 is configured to transmit the first color laser beam and the second color laser beam and reflect the third color laser beam exiting from the diffractive optical element 12 corresponding to the third frame 1023. As such, the first color laser beam, the second color laser beam, and the third color laser beam can be combined, and the combined laser beams exit from a side of the third light-combining mirror 133.

Continuing to refer to FIG. 30, the first light-combining mirror group 13 may further include a polarization conversion element 135. The polarization conversion element 135 is provided between the diffractive optical element 12 corresponding to the first frame 1021 and the first light-combining mirror 131 and between the diffractive optical element 12 corresponding to the second frame 1022 and the second light-combining mirror 132, and is configured to convert polarization polarity of at least a portion of the first color laser beam and polarization polarity of at least a portion of the second color laser beam, respectively.

For another example, as shown in FIG. 31, in contrast to FIG. 30, the number of laser devices 11 is increased. In this case, the laser devices 11 include two of the above-mentioned laser devices 11 and the two laser devices 11 are disposed opposite each other.

Figure 17:
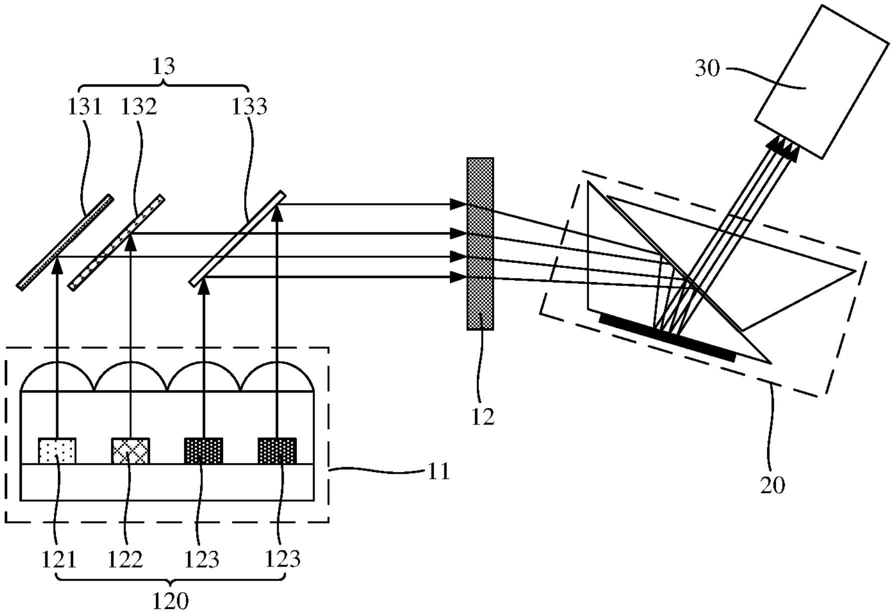
FIG. 17 is a diagram illustrating an optical path of still another laser projection apparatus according to some embodiments.
Figure 19:
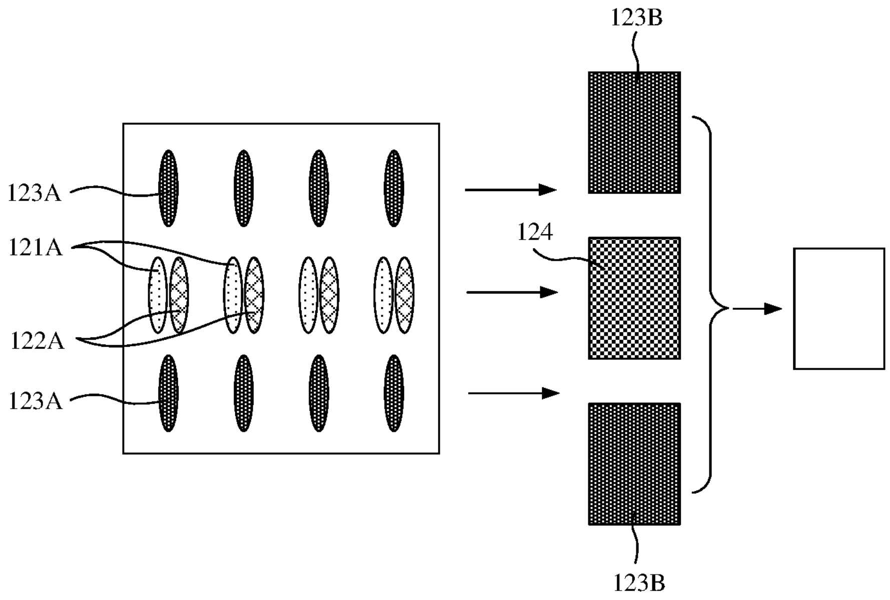
FIG. 19 is a schematic diagram of light spots of laser beams in FIG. 18 before and after the laser beams pass through a diffractive optical element.

FIG. 17 is a structural diagram of still another laser projection apparatus according to some embodiments. FIG. 18 is a structural diagram of still another laser projection apparatus according to some embodiments. FIG. 19 is a schematic diagram of light spots of laser beams in FIG. 18 before and after the laser beams pass through a diffractive optical element. In contrast to FIG. 15 and FIG. 16, the relative positions of the first light-combining mirror group 13 and the diffractive optical element 12 are changed in FIG. 17 and FIG. 18.

In some embodiments, the first light-combining mirror group 13 is disposed at the light-incident side of the diffractive optical element 12. As such, after the laser beams of different colors are combined by the first light-combining mirror group 13, the diffractive optical element 12 shapes and homogenizes the combined laser beams.

For example, as shown in FIG. 17 and FIG. 18, the first light-combining mirror group 13 is disposed at the side of the light-output surface 170 distal from the light-emitting components 120, the diffractive optical element 12 is disposed at a light-output side of the first light-combining mirror group 13, and the diffractive optical element 12 is configured to shape and homogenize the combined laser beams.

The light spots of the laser beams emitted by the first light-emitting components 121, the second light-emitting components 122, and the third light-emitting components 123 and combined by the first light-combining mirror group 13 are shown in FIG. 19. The first light spot 121A and the second light spot 122A of the laser beams emitted by the first light-emitting components 121 and the second light-emitting components 122 and combined by the first light-combining mirror group 13 are close in position and have Gaussian distributions. The third light spot 123A of the third-color laser beam emitted by the third light-emitting components 123 and combined by the first light-combining mirror group 13 has a Gaussian distribution. Moreover, the first light spot 121A, the second light spot 122A, and the third light spot 123A are elliptical.

After being shaped by the diffractive optical element 12, the first light spot 121A of the first-color laser beam and the second light spot 122A of the second-color laser beam are shaped into a seventh light spot 124 with a uniform intensity distribution, the third light spot 123A of the third-color laser beam is shaped into the sixth light spot 123B with a uniform intensity distribution, and the sixth light spot 123B and the seventh light spot 124 are rectangular. Moreover, the diffractive optical element 12 transmits the shaped sixth light spot 123B and seventh light spot 124 to the same position, such that the sixth light spot 123B and the seventh light spot 124 are combined to form a white rectangular light spot with a uniform intensity distribution and a set size.

The diffractive optical element 12 is disposed at the light-output side of the first light-combining mirror group 13, such that the diffractive optical element 12 shapes and homogenizes the light spots of the laser beams combined by the first light-combining mirror group 13 and transmits the shaped light spots to the same position, further improving the coincidence degree of the light spots of the combined laser beams, which is conducive to improving the display effect of the projection picture.

It should be noted that the same position mentioned above refers to a distance between the centers of the light spots being less than or equal to 3 mm.

Figure 20:
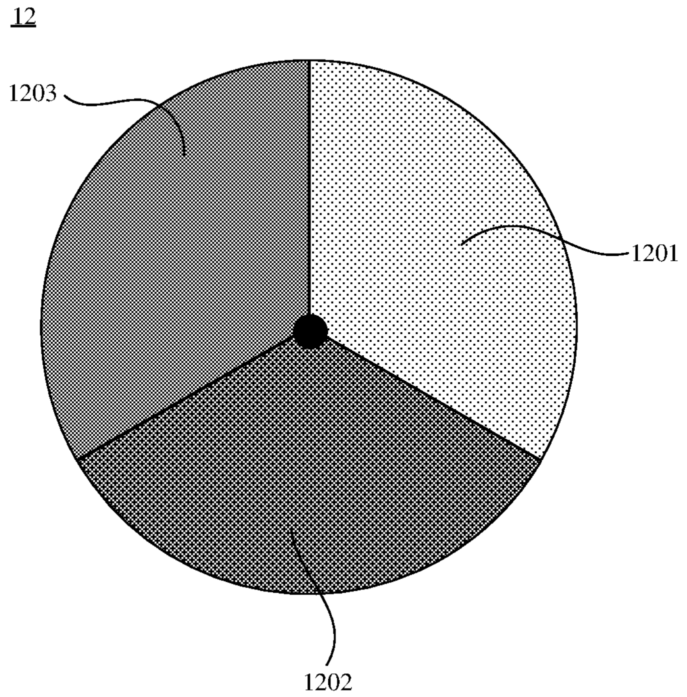
FIG. 20 is a structural diagram of another diffractive optical element according to some embodiments.

FIG. 20 is a structural diagram of another diffractive optical element according to some embodiments.

In some embodiments, the diffractive optical element 12 is movable, in which case the diffractive optical element 12 in FIG. 17 includes the first diffractive area 1201, the second diffractive area 1202, and the third diffractive area 1203.

For example, as shown in FIG. 20, the diffractive optical element 12 includes the first diffractive area 1201, the second diffractive area 1202, and the third diffractive area 1203. The laser device 11 emits the first-color laser beam, the second-color laser beam, and the third-color laser beam in a time-division mode. In the case that the laser device 11 emits the first-color laser beam, a driving component (e.g., a motor) drives the diffractive optical element 12 to rotate, such that the first diffractive area 1201 is disposed on an optical path of the first-color laser beam exiting from the first light-combining mirror group 13 to shape the first-color laser beam. In the case that the laser device 11 emits the second-color laser beam, the driving component drives the diffractive optical element 12 to rotate, such that the second diffractive area 1202 is disposed on an optical path of the second-color laser beam exiting from the first light-combining mirror group 13 to shape the second-color laser beam. In the case that the laser device 11 emits the third-color laser beam, the driving component drives the diffractive optical element 12 to rotate, such that the third diffractive area 1203 is disposed on an optical path of the third-color laser beam exiting from the first light-combining mirror group 13 to shape the third-color laser beam.

As such, the diffractive optical element 12 disposed at the light-output side of the first light-combining mirror group 13 corresponds to the laser beams of different colors, separately, and shapes the laser beams of different colors.

However, some embodiments of the present disclosure are not limited thereto.

Figure 21:
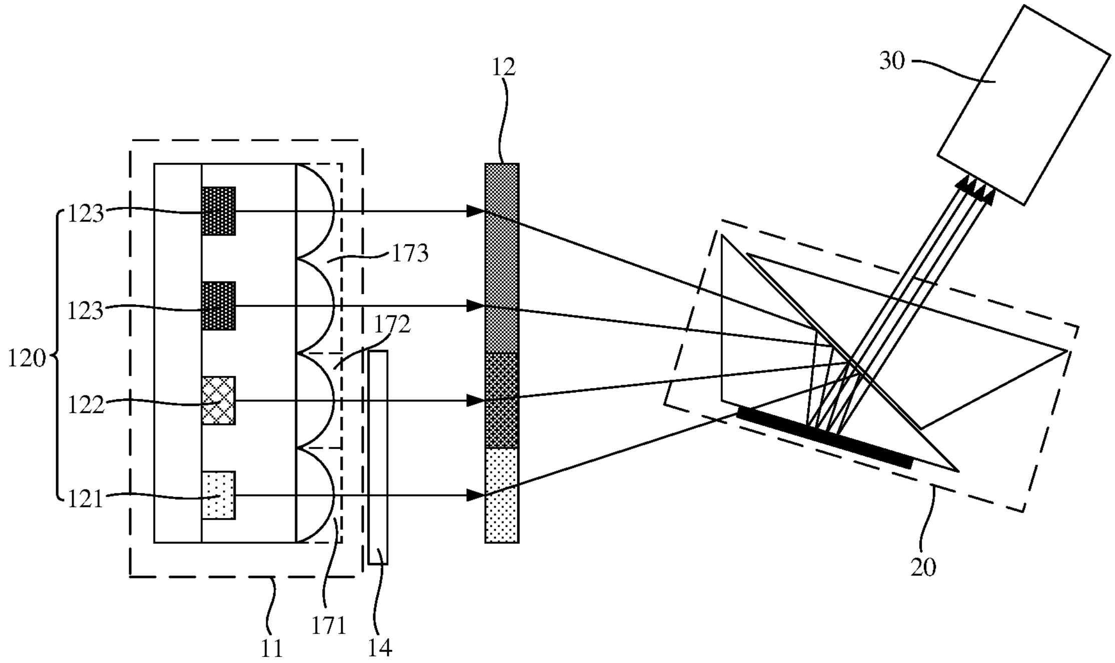
FIG. 21 is a diagram illustrating an optical path of still another laser projection apparatus according to some embodiments.

FIG. 21 is a structural diagram of still another laser projection apparatus according to some embodiments. In contrast to FIG. 17 and FIG. 18, the light source assembly 10 omits the first light-combining mirror group 13 in FIG. 21.

In some embodiments, the first diffractive area 1201, the second diffractive area 1202, and the third diffractive area 1203 transmit the shaped rectangular light spots to the same position. In this case, the first light-combining mirror group 13 is omitted.

For example, as shown in FIG. 21, the first diffractive area 1201, the second diffractive area 1202, and the third diffractive area 1203 transmit the shaped rectangular light spots to the same position, such that the fourth light spot 121B, the fifth light spot 122B, and the sixth light spot 123B are mixed to form a white rectangular light spot with a uniform intensity distribution and a set size. Moreover, the white rectangular light spot satisfies the use requirements of the light modulation device. As such, the laser beams exiting from the diffractive optical element 12 are directly incident on the light modulation device as the illumination beam, without additionally providing the first light-combining mirror group 13 to combine the laser beams, which is conducive to simplifying the structure of the optical system.

It should be noted that FIG. 21 illustrates an example in which the diffractive optical element 12 and the laser device 11 are disposed independent of each other, but some embodiments of the present disclosure are not limited thereto. In the case that the diffractive optical element 12 is integrally packaged with the laser device 11, the first diffractive area 1201, the second diffractive area 1202, and the third diffractive area 1203 transmit the shaped rectangular light spots to the same position to simplify the structure of the optical system.

In some embodiments, the first-color laser beam, the second-color laser beam, and the third-color laser beam are each linearly polarized lights. Moreover, the first-color laser beam and the second-color laser beam have the same polarization direction, and the polarization direction of the first-color laser beam and the second-color laser beam is perpendicular to the polarization direction of the third-color laser beam. For example, the first-color laser beam is a blue laser beam, the second-color laser beam is a green laser beam, the third-color laser beam is a red laser beam, the blue laser beam and the green laser beam are S-polarized lights, the red laser beam is a P-polarized light, and the P-polarized light is perpendicular to the S-polarized lights.

In this case, as shown in FIG. 21, the laser device 11 further includes a phase retarder 14 (e.g., a half-wave plate). The phase retarder 14 is disposed at a light-output side of the first light-output area 171 and the second light-output area 172, and is configured to change the polarization direction of the incident laser beams. As such, the polarization direction of the first-color laser beam and the second-color laser beam is modified to be the same as the polarization direction of the third-color laser beam by the phase retarder 14, avoiding the problem that the projection picture has color blocks due to different transmittances of the optical lens for different polarized lights.

In addition, the phase retarder 14 may be disposed at the light-output side of the third light-output area 173 to change the polarization direction of the third-color laser beam exiting from the third light-output area 173, such that the polarization direction of the third-color laser beam exiting from the third light-output area 173 is modified to be the same as the polarization direction of the laser beams exiting from the first light-output area 171 and the second light-output area 172.

Figure 22:
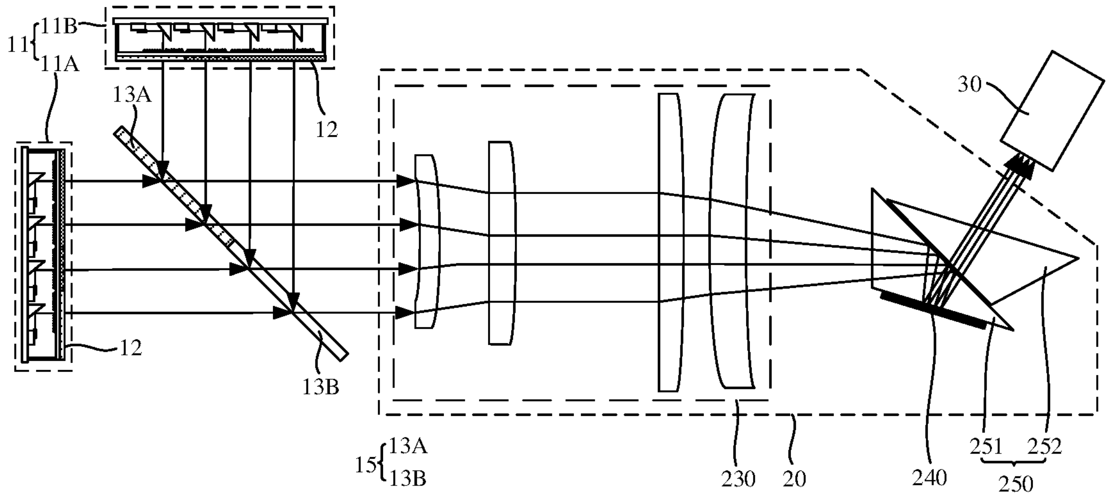
FIG. 22 is a diagram illustrating an optical path of still another laser projection apparatus according to some embodiments.
Figure 23:
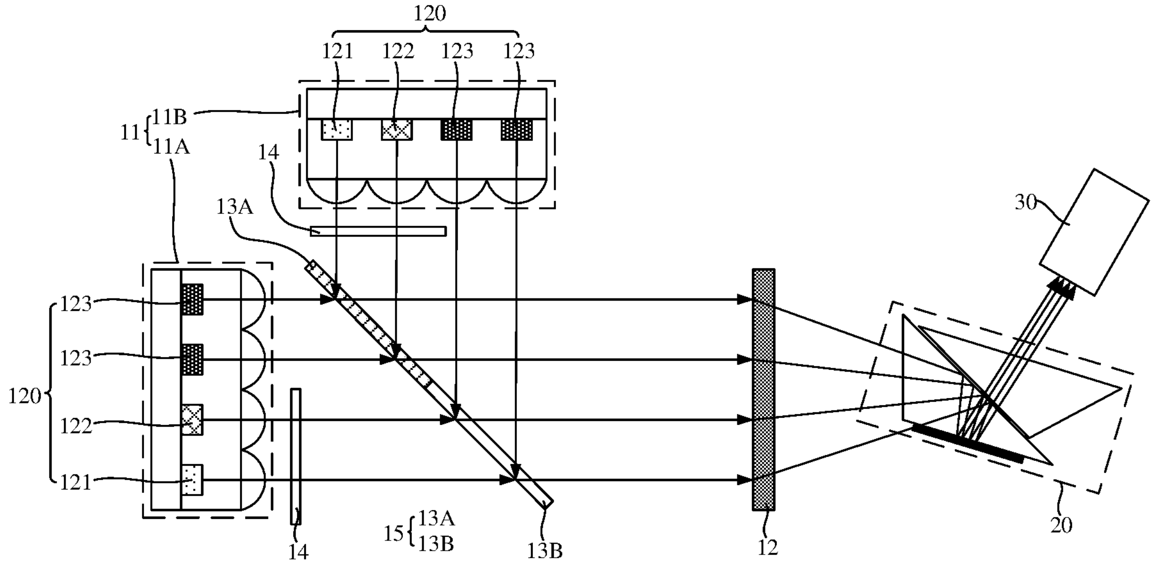
FIG. 23 is a diagram illustrating an optical path of still another laser projection apparatus according to some embodiments.
Figure 24:
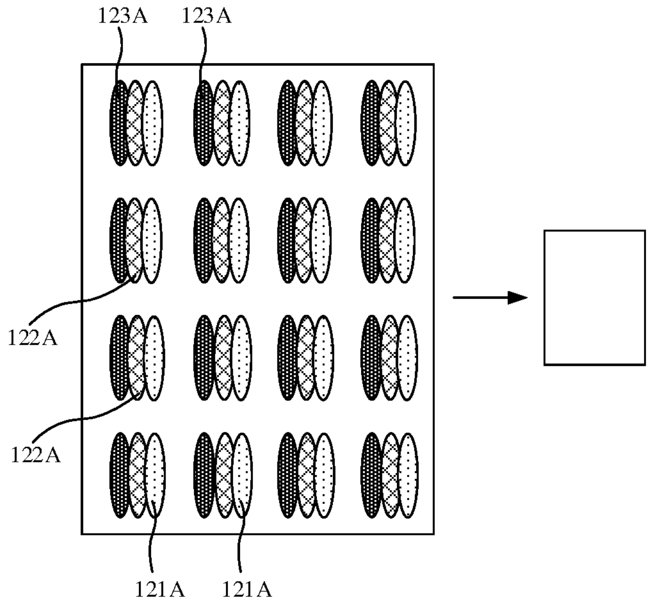
FIG. 24 is a schematic diagram of light spots of laser beams in FIG. 23 before and after the laser beams pass through a diffractive optical element.

FIG. 22 is a structural diagram of still another laser projection apparatus according to some embodiments. FIG. 23 is a structural diagram of still another laser projection apparatus according to some embodiments. FIG. 24 is a schematic diagram of light spots of laser beams in FIG. 23 before and after the laser beams pass through a diffractive optical element. In contrast to FIG. 17, the number of the laser device 11 is increased in FIG. 22 and FIG. 23.

In some embodiments, the light source assembly 10 includes at least two of the laser devices 11 as described above. In this case, the first light-combining mirror group 13 is omitted, in which case the light source assembly includes a second light-combining mirror group 15. The second light-combining mirror group 15 is disposed at an intersection of laser beams emitted by the at least two of the laser devices 11 to combine the laser beams emitted by the at least two of the laser devices 11.

For example, as shown in FIG. 22 and FIG. 23, the light source assembly 10 includes a first laser device 11A and a second laser device 11B, and the light-output direction of the first laser device 11A is perpendicular to the light-output direction of the second laser device 11B. Moreover, the first laser device 11A and the second laser device 11B have the same structure. For example, the first laser device 11A and the second laser device 11B each include first light-emitting components 121, second light-emitting components 122, and third light-emitting components 123, and the three types of light-emitting components 120 have the same arrangement.

In this case, the second light-combining mirror group 15 is disposed at the intersection of the laser beams emitted by the first laser device 11A and the second laser device 11B, and is configured to combine the laser beams emitted by the first laser device 11A and the second laser device 11B.

The second light-combining mirror group 15 includes a fourth light-combining mirror 13A and a fifth light-combining mirror 13B. The fourth light-combining mirror 13A is disposed at an intersection of the third-color laser beam emitted by the first laser device 11A with the first-color laser beam and the second-color laser beam emitted by the second laser device 11B. The fourth light-combining mirror 13A is configured to transmit the third-color laser beam and reflect the first-color laser beam and the second-color laser beam. The fifth light-combining mirror 13B is disposed at an intersection of the first-color laser beam and the second-color laser beam emitted by the first laser device 11A with the third-color laser beam emitted by the second laser device 11B. The fifth light-combining mirror 13B is configured to transmit the first-color laser beam and the second-color laser beam and reflect the third-color laser beam. As such, the laser beams of different colors emitted by the two laser devices 11 are combined.

It should be noted that, in the case that the light source assembly 10 includes two of the laser devices 11 and the second light-combining mirror group 15, the diffractive optical element 12 may be disposed in the accommodating space 105 (as shown in FIG. 22), or disposed between the light-output surface 170 and the second light-combining mirror group 15, or disposed at a light-output side of the second light-combining mirror group 15 (as shown in FIG. 23).

FIG. 24 is a schematic diagram of light spots of laser beams in FIG. 23 before and after the laser beams pass through a diffractive optical element.

As shown in FIG. 24, the first light spot 121A, the second light spot 122A, and the third light spot 123A of the laser beams emitted by the first light-emitting components 121, the second light-emitting components 122, and the third light-emitting components 123 and combined by the second light-combining mirror group 15 are close in position and have Gaussian distributions. The three light spots are close in position, such that a plurality of independent white light spots are formed.

After being diffracted by the diffractive optical element 12, the white light spots formed by the first light spot 121A, the second light spot 122A, and the third light spot 123A are transmitted to the same position, such that the plurality of white light spots are shaped into a rectangular light spot with a uniform intensity distribution and a set size. In addition, the light source assembly 10 may employ three or more of the laser devices 11.

The foregoing is only for specific embodiments of the present disclosure, without limiting the scope of the present disclosure. Any changes or substitutions within the disclosed technical scope of the present disclosure made by any person skilled in the art shall be included in the protection scope of the present disclosure. Therefore, the protection scope of the present disclosure shall be subject to the protection scope of the claims.

What is claimed is:

1. A laser device, comprising:

a plurality of light-emitting components, configured to emit laser beams of various colors;

a first light-combining mirror group disposed on light-output paths of the plurality of light-emitting components; and a diffractive optical element disposed on the light-output paths of the plurality of light-emitting components, wherein the diffractive optical element comprises a plurality of diffractive areas, each of the plurality of diffractive areas corresponding to one color laser beam; and the diffractive optical element is disposed at a light-output side of the first light-combining mirror group, and the diffractive optical element is configured to enable the diffractive areas in the diffractive optical element to shape the laser beams of corresponding colors at different times.

2. The laser device according to claim 1, wherein the plurality of light-emitting components are configured to emit a first-color laser beam, a second-color laser beam, and a third-color laser beam; and the plurality of diffractive areas comprise a first diffractive area, a second diffractive area, and a third diffractive area, wherein the first diffractive area, the second diffractive area, and the third diffractive area correspond to the first-color laser beam, the second-color laser beam, and the third-color laser beam, respectively.

3. The laser device according to claim 2, wherein the first diffractive area is disposed on a light-output path of a light-emitting component emitting the first-color laser beam, and the first diffractive area is configured to shape the first-color laser beam;

the second diffractive area is disposed on a light-output path of a light-emitting component emitting the second-color laser beam, and the second diffractive area is configured to shape the second-color laser beam; and the third diffractive area is disposed on a light-output path of a light-emitting component emitting the third-color laser beam, and the third diffractive area is configured to shape the third-color laser beam;

wherein the first diffractive area, the second diffractive area, and the third diffractive area are configured to transmit the shaped laser beams to a same position.

4. The laser device according to claim 3, further comprising a light-output surface, wherein the laser beams exit from the light-output surface, and the diffractive optical element is disposed at a side of the light-output surface distal from the light-emitting components and spaced apart from the light-output surface.

5. The laser device according to claim 3, further comprising:

a light-output surface, wherein the laser beams exit from the light-output surface;

wherein the first light-combining mirror group is disposed at a side of the light-output surface distal from the light-emitting components and configured to combine the laser beams exiting from the light-output surface;

wherein the plurality of light-emitting components are configured to emit laser beams of different colors in a time-division mode and the diffractive optical element is movable.

6. The laser device according to claim 2, wherein the first-color laser beam is one of a green laser beam and a blue laser beam, the second-color laser beam is the other of the green laser beam and the blue laser beam, and the third-color laser beam is a red laser beam.

7. The laser device according to claim 1, further comprising:

a package comprising:

a base plate; and a frame disposed on the base plate and configured to form an accommodating space with the base plate to accommodate the plurality of light-emitting components;

a light-transmitting layer disposed at a side of the frame distal from the base plate and being configured to enclose the accommodating space; and a collimating lens disposed above the light-transmitting layer and configured to collimate the incident laser beams;

wherein the diffractive optical element is disposed at a side of the light-transmitting layer distal from the collimating lens.

8. The laser device according to claim 7, wherein the collimating lens comprises a collimating lens group disposed at a side of the light-transmitting layer distal from the light-emitting components and configured to collimate the incident laser beams, and the diffractive optical element is disposed at a side of the light-transmitting layer proximal to the light-emitting components; or the collimating lens comprises a Fresnel structure disposed at a side of the light-transmitting layer proximal to the light-emitting components and configured to collimate the incident laser beams, and the diffractive optical element is disposed at a side of the light-transmitting layer distal from the light-emitting components.

9. The laser device according to claim 1, further comprising:

a package comprising:

a base plate; and a frame disposed on the base plate and forming an accommodating space with the base plate to accommodate the plurality of light-emitting components; and a Fresnel structure disposed on a surface of the diffractive optical element proximal to the light-emitting components and configured to collimate the incident laser beams;

wherein the diffractive optical element is disposed at a side of the frame distal from the base plate to enclose the accommodating space.

10. The laser device according to claim 1, wherein the diffractive optical element comprises:

a substrate; and a plurality of diffractive portions disposed on the substrate, wherein the plurality of diffractive portions are distributed in a two-dimensional matrix.

11. The laser device according to claim 10, wherein the plurality of diffractive portions are in a step shape, and a number of the plurality of diffractive portions is an exponential multiple of 2.

12. The laser device according to claim 11, wherein a formula for calculating a height of each of the diffractive portions is $$h = \frac{\lambda}{(2 * k * (n - 1))}$$

wherein h represents the height of the diffractive portion, k represents the number of the diffractive portions, n represents a refractive index of a laser beam, λ represents a wavelength of the laser beam.

13. A laser projection apparatus, comprising:

a light source assembly, configured to emit an illumination beam, the light source assembly comprising:

a plurality of laser devices as defined in claim 1; and a second light-combining mirror group disposed at an intersection of laser beams emitted by the plurality of laser devices and configured to combine the laser beams emitted by the plurality of laser devices;

a light modulating assembly, configured to modulate the illumination beam emitted by the light source assembly to acquire a projection beam, wherein the light modulating assembly comprises a light modulation device configured to modulate the illumination beam emitted by the light source assembly to acquire the projection beam, and a light-receiving surface of the light modulating assembly is rectangular; and a projection lens, configured to perform imaging with the projection beam.

14. The laser projection apparatus according to claim 13, wherein the light modulating assembly further comprises:

a reflecting assembly disposed at a light-output side of the light source assembly, wherein the reflecting assembly comprises a reflecting mirror or a total-reflection prism assembly, and the reflecting assembly is configured to reflect the illumination beam emitted by the light source assembly to the light modulation device at a set angle; and a lens assembly disposed between the light source assembly and the reflecting assembly, and configured to collimate and then converge the illumination beam, before the illumination beam exits to the reflecting assembly.

15. A laser projection apparatus, comprising:

a light source assembly comprising the laser device as defined in claim 1, wherein the light source assembly is configured to emit an illumination beam;

a light modulating assembly, configured to modulate the illumination beam emitted by the light source assembly to acquire a projection beam, wherein the light modulating assembly comprises a light modulation device configured to modulate the illumination beam emitted by the light source assembly to acquire the projection beam; and a projection lens, configured to perform imaging with the projection beam.

16. The laser projection apparatus according to claim 15, wherein the light modulating assembly further comprises:

a reflecting assembly disposed at a light-output side of the light source assembly, wherein the reflecting assembly comprises a reflecting mirror or a total-reflection prism assembly, and the reflecting assembly is configured to reflect the illumination beam emitted by the light source assembly to the light modulation device at a set angle;

a lens assembly disposed between the light source assembly and the reflecting assembly, and configured to collimate and then converge the illumination beam, before the illumination beam exits to the reflecting assembly.

17. A laser device, comprising:

a plurality of light-emitting components, configured to emit laser beams of various colors;

a first light-combining mirror group disposed on light-output paths of the plurality of light-emitting components and configured to combine the laser beams emitted by the plurality of light-emitting components; and a diffractive optical element disposed at a light-output side of the first light-combining mirror group and configured to shape the laser beams combined by the first light-combining mirror group and transmit light spots of the shaped laser beams to a same position.

18. The laser device according to claim 17, wherein a first-color laser beam is one of a green laser beam and a blue laser beam, a second-color laser beam is the other of the green laser beam and the blue laser beam, and a third-color laser beam is a red laser beam.

19. The laser device according to claim 17, wherein the diffractive optical element comprises:

a substrate; and a plurality of diffractive portions disposed on the substrate, wherein the plurality of diffractive portions are distributed in a two-dimensional matrix.

20. The laser device according to claim 19, the plurality of diffractive portions are in a step shape, and a number of the plurality of diffractive portions is an exponential multiple of 2.

* * * * *